United States Patent
Knopf et al.

(10) Patent No.: US 11,896,967 B2
(45) Date of Patent: Feb. 13, 2024

(54) LARGE PARTICLE, HIGH PERFORMANCE CATALYTIC TAPE

(71) Applicant: W. L. Gore & Associates, Inc., Newark, DE (US)

(72) Inventors: Jeffrey A. Knopf, Newark, DE (US); Franz J. Shelley, Newark, DE (US); Zhuonan Song, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 64 days.

(21) Appl. No.: 17/594,180

(22) PCT Filed: Apr. 9, 2020

(86) PCT No.: PCT/US2020/027475
§ 371 (c)(1),
(2) Date: Oct. 5, 2021

(87) PCT Pub. No.: WO2020/210496
PCT Pub. Date: Oct. 15, 2020

(65) Prior Publication Data
US 2022/0212181 A1 Jul. 7, 2022

Related U.S. Application Data

(60) Provisional application No. 62/833,398, filed on Apr. 12, 2019.

(51) Int. Cl.

| | |
|---|---|
| *B01J 35/06* | (2006.01) |
| *B01D 53/86* | (2006.01) |
| *B01D 53/94* | (2006.01) |
| *B01J 21/06* | (2006.01) |
| *B01J 23/22* | (2006.01) |
| *B01J 31/06* | (2006.01) |
| *B01J 35/02* | (2006.01) |

(52) U.S. Cl.
CPC ........ *B01J 35/065* (2013.01); *B01D 53/8628* (2013.01); *B01D 53/9413* (2013.01); *B01J 21/063* (2013.01); *B01J 23/22* (2013.01); *B01J 31/06* (2013.01); *B01J 35/026* (2013.01); *B01D 2255/20723* (2013.01); *B01D 2255/9202* (2013.01)

(58) Field of Classification Search
None
See application file for complete search history.

(56) References Cited

U.S. PATENT DOCUMENTS 6,218,000 B1 4/2001 Rudolf

FOREIGN PATENT DOCUMENTS

| | | | |
|---|---|---|---|
| CA | 1340720 | * | 8/1995 |
| CN | 106310579 | * | 1/2017 |
| EP | 0854751 A1 | | 7/1998 |
| EP | 2409954 A1 | | 1/2012 |
| JP | H100230119 A | | 9/1998 |
| JP | 10230119 | * | 11/1998 |
| JP | 2002282627 | * | 10/2002 |
| WO | 9706877 | * | 2/1997 |
| WO | 2018146603 | * | 8/2018 |

OTHER PUBLICATIONS

International Search Report and Written Opinion issued in PCT/US2020/027475, dated Jun. 24, 2020, 19 pages.

* cited by examiner

*Primary Examiner* — Sheng H Davis
(74) *Attorney, Agent, or Firm* — W. L. Gore & Associates, Inc.; Amy Miller

(57) ABSTRACT

The present disclosure is directed to a catalytic composite that comprises porous supported catalyst particles durably enmeshed in a porous fibrillated polymer membrane. The supported catalyst particles are composed of at least one metal or metal oxide catalyst dispersed on a porous support substrate. In some embodiments, the porous fibrillated polymer membrane is perforated or otherwise contains mechanically formed holes therein. The supported catalyst particles have a large particle population based, at least in part, a d90 value greater than 100 microns. The catalytic membrane composite may be used in filtration applications to remove air polluting substances such as Sox, NOx, dioxin/furan, CO, and others and convert them into non-polluting or less-polluting gas components. Additionally, the catalytic article may be in the form of a filter bag, a honeycomb, a monolith or any other suitable geometrically structured forms.

15 Claims, 16 Drawing Sheets

LARGE PARTICLE, HIGH PERFORMANCE CATALYTIC TAPE

FIELD

The present disclosure relates generally to filtration materials, and more specifically, to a porous fibrillated polymer membrane that includes supported catalyst particles durably enmeshed within the porous fibrillated polymer membrane that may be used in to filter noxious chemicals.

BACKGROUND

Catalytic filters are employed for a variety of fluid filtering applications. Typically, these filters combine a catalytic material (e.g., $TiO_2$, $V_2O_5$, $WO_3$, $Al_2O_3$, $MnO_2$, zeolites, and/or transition metal compounds and their oxides) within a matrix. As the fluid passes over or through the matrix, contaminants within the fluid react with catalyst particles to convert the contaminants to a more desirable by- or end-product, and therefore remove select species of contaminants from the fluid stream.

During filter operation, chemical deterioration and mechanical deterioration of the catalyst may occur. Catalytic filters may have limited operating lives due to particle, liquid, and gaseous contamination from a fluid stream (i.e., fine dust particles, metals, silica, salts, metal oxides, hydrocarbons, water, acid gases, phosphorous, alkaline metals, arsenic, alkali oxides, etc.). Deactivation of the catalyst may occur because the active sites on the catalysts within the filter are physically masked or chemically altered. Unless these contaminants can be shed from the catalyst, the filter will rapidly diminish in efficiency until it insufficient for use. Additionally, in some instances, the processing aids used in manufacture may cause deterioration of the catalysts.

Another form of chemical deterioration is due to the loss of inserted catalysts during operation. The catalyst particles in many instances are not attached strongly enough to the host fibers to withstand the rigors of normal operation. As a result, the catalyst particles fall out of the filter, thereby not only diminishing filter effectiveness, but also contaminating the clean fluid stream.

Thus, there is a need in the art for a catalytic article that effectively retains the catalyst particles and effectively remediates contamination such as NOx and SOx.

SUMMARY

According to one aspect, ("Aspect 1"), a catalytic article includes a porous fibrillated polymer membrane including supported catalyst particles durably enmeshed within the porous fibrillated polymer membrane where the supported catalyst particles have a particle size distribution defined by a D90 value of at least 60 microns.

According to another aspect, ("Aspect 2"), further to Aspect 1, the supported catalyst particles have a particle size distribution defined by a D90 value of at least 100 microns.

According to another aspect, ("Aspect 3"), further to Aspect 1 or Aspect 2, a mean particle size of the supported catalyst particle is greater than or equal to 20 microns.

According to another aspect, ("Aspect 4"), further to any one of the preceding Aspects, the supported catalyst particles have a mean particle size greater than about 20 microns.

According to another aspect, ("Aspect 5"), further to any one of the preceding Aspects, the supported catalyst particles include at least one metal or metal oxide catalyst dispersed on a porous support substrate.

According to another aspect, ("Aspect 6"), further to any one of the preceding Aspects, the porous fibrillated membrane includes supported catalyst particles in a range from about 30% to about 98% by weight of the supported catalyst particle.

According to another aspect, ("Aspect 7"), further to any one of the preceding Aspects, the porous fibrillated polymer membrane has a porosity from about 20% to about 90%.

According to another aspect, ("Aspect 8"), further to any one of the preceding Aspects, the porous fibrillated polymer membrane includes polytetrafluorethylene (PTFE), poly (ethylene-co-tetrafluoroethylene) (ETFE), ultra-high molecular weight polyethylene (UHMWPE), polyparaxylylene (PPX), polylactic acid, and any combination or blend thereof.

According to another aspect, ("Aspect 9"), further to any one of the preceding Aspects, the supported catalyst particles have a particle population with a D50 value of 7 microns or more.

According to another aspect, ("Aspect 10"), further to any one of the preceding Aspects, at least 40% of the porosity includes a pore size greater than 9 microns.

According to another aspect, ("Aspect 11"), further any one of the preceding Aspects, the porous fibrillated polymer membrane contains perforations therein.

According to another aspect, ("Aspect 12"), further to any one of the preceding Aspects, the catalytic article is in the form of a filter bag, a honeycomb, monolith or any other suitable geometrically structured forms.

According to another aspect, ("Aspect 13"), further to any one of the preceding Aspects, the supported catalyst particle is located throughout the thickness of the fibrillated polymer membrane.

According to another aspect, ("Aspect 14"), a catalytic filter material including the catalytic article of any one of the preceding Aspects.

According to another aspect, ("Aspect 15"), a method to reduce NOx from a gas stream includes (a) providing a gas stream comprising a concentration NOx and (b) contacting the gas stream with the catalytic article of any preceding claim, whereby the NOx concentration is reduced.

According to another aspect, ("Aspect 16"), a NOx reaction system includes a catalytic article and a fluid stream that includes NOx.

According to another aspect, ("Aspect 17"), further to Aspect 16, the fluid stream is a flue gas or automotive exhaust.

According to another aspect, ("Aspect 18"), further to Aspect 16 or Aspect 17, the catalytic article is in the form of a filter bag, a honeycomb, monolith or any other suitable geometrically structured forms.

According to another aspect, ("Aspect 19"), further to any one of Aspects 16 to 18, the catalytic article includes a porous fibrillated polymer membrane including supported catalyst particles durably enmeshed within the porous fibrillated polymer membrane.

According to another aspect, ("Aspect 20"), further to Aspect 19, the supported catalyst particles have a particle size distribution defined by a D90 value of at least 60 microns.

According to another aspect, ("Aspect 21"), further to Aspect 19 or Aspect 20, the supported catalyst particles include at least one metal or metal oxide catalyst dispersed on a porous support substrate.

According to another aspect, ("Aspect 22"), further to any one of Aspects 19 to 21, the supported catalyst particles comprise at least one metal or metal oxide catalyst dispersed on a porous support substrate.

According to another aspect, ("Aspect 23"), further to any one of Aspects 19 to 22, the supported catalyst particles include at least one metal or metal oxide catalyst dispersed on a porous support substrate.

According to another aspect, ("Aspect 24"), further to any one of Aspects 19 to 23, the supported catalyst particle is located throughout the thickness of the porous fibrillated polymer membrane.

According to another aspect, ("Aspect 25"), further to any one of Aspects 19 to 24, a mean particle size of the supported catalyst particle is greater than or equal to 20 microns.

According to another aspect, ("Aspect 26"), further to any one of Aspects 19 to 25, the supported catalyst particles have a mean particle size greater than about 20 microns.

According to another aspect, ("Aspect 27"), further to any one of Aspects 19 to 26, the porous fibrillated membrane includes the supported catalyst particles in a range from about 30% to about 98% by weight of the supported catalyst particle.

According to another aspect, ("Aspect 28"), further to any one of Aspects 19 to 27, the porous fibrillated polymer membrane has a porosity from about 20% to about 90%.

According to another aspect, ("Aspect 29"), further to any one of Aspects 19 to 28, the porous fibrillated polymer membrane includes polytetrafluoroethylene (PTFE), poly (ethylene-co-tetrafluoroethylene) (ETFE), ultra-high molecular weight polyethylene (UHMWPE), polyparaxylylene (PPX), polylactic acid, and any combination or blend thereof.

According to another aspect, ("Aspect 30"), further to any one of Aspects 19 to 29, the porous fibrillated polymer membrane contains perforations therein.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Figure 1:
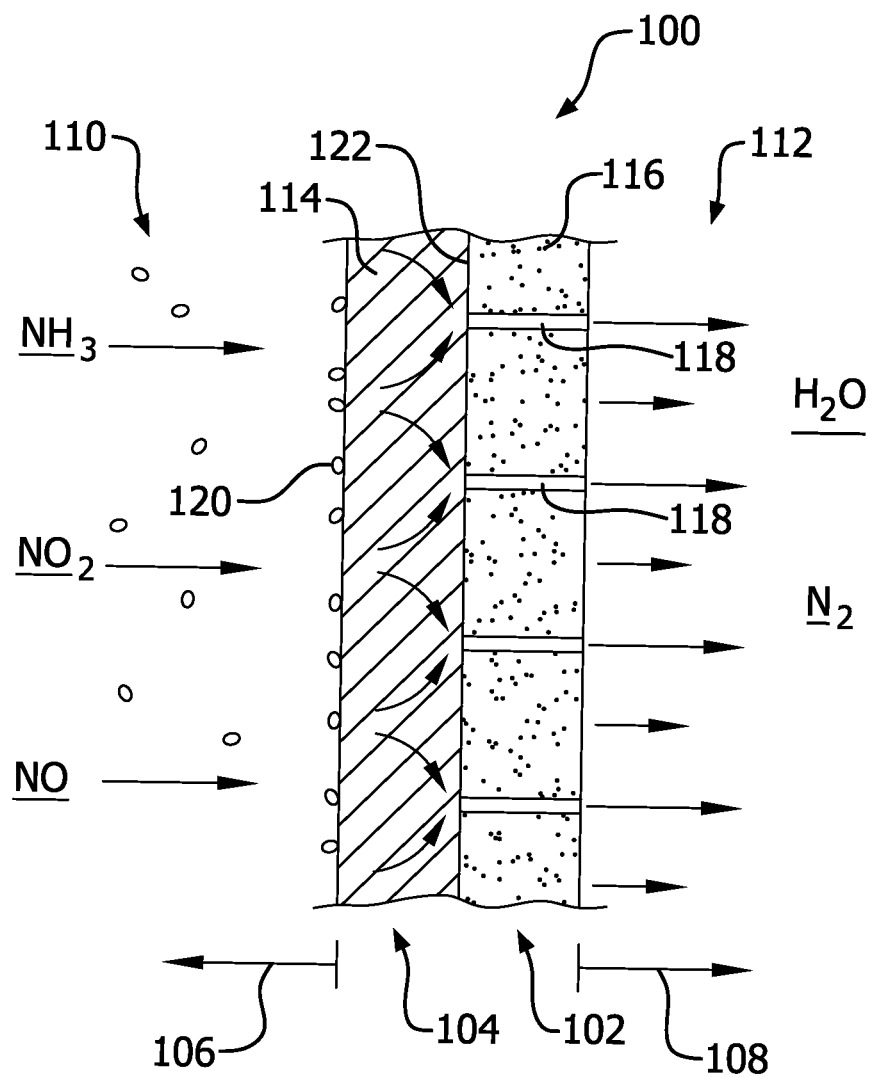
FIG. 1 is a schematic illustration of a composite filter material that includes a perforated, porous catalytic fluoropolymer film assembled with an upstream felt batt, in accordance with at least one embodiment.

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the drawing figures should not be construed as limiting. The use of the term "filtration" in the present disclosure is intended to encompass the filtration any form of readily flowing material, including both liquids and gases.

The present disclosure is directed to a catalytic composite that includes or is formed of porous supported catalyst particles durably enmeshed in a porous fibrillated polymer membrane. It should be noted that the supported catalyst particles may be porous, non-porous or substantially non-porous. As used herein, the term "substantially non-porous" is meant to denote that there is a measurable amount of porosity, but not exceeding 5%. The supported catalyst particles are composed of at least one metal or metal oxide catalyst dispersed on a porous support substrate. In some embodiments, the porous fibrillated polymer membrane is perforated or otherwise contains mechanically formed holes therein. The catalytic membrane composite may be used in filtration applications to remove air-polluting substances such as, but not limited to, SOx, NOx, dioxin/furan, and CO (e.g., from flue gases or automotive exhaust) and convert them into non-polluting or less-polluting gas components. Additionally, the catalytic article may be in the form of a filter bag, a honeycomb, a monolith or any other suitable geometrically structured forms.

The supported catalyst particles include or are formed of at least one catalytic metal or metal oxide particle that is supported on and/or within a support substrate. Non-limiting examples of catalyst particles suitable for incorporation onto the support substrate include vanadium pentoxide, vanadium oxide, tungsten trioxide, titanium dioxide, iron oxide, copper oxide, molybdenum oxide, chromium oxide, and combinations thereof. In some embodiments, the metal or metal oxide catalysts are suitable for catalyzing the reduction of, or removal of, NOx species such as NO, $NO_2$, $NO_3$ to water and nitrogen gas. The metal or metal oxide catalysts may be dispersed onto and/or into the support substrate by known and optimized processes described in the art including, but not limited to, precipitation, plating, atomic layer deposition, and molecular layer depositions. High catalytic activity is gained by the effective dispersion of the catalyst such that the catalyst covers the support substrate and/or is interspersed in the pores of the support substrate.

The support substrate is not particularly limiting so long as it does not affect the end use of the catalytic composite. In some embodiments, the support substrate is porous. Examples of materials for use as the support substrate include, but are not limited to, metals, metal oxides (e.g., titanium dioxide, aluminum oxide, etc.), zeolites, carbons, clays, and combinations thereof.

The supported catalyst particles include or are formed of at least one catalytic metal or metal oxide that is supported on and/or within a support substrate. In some embodiments, the catalyst particles are durably enmeshed in an expanded polymer matrix. As used herein, the phrase "durably enmeshed" is meant to describe a catalyst particle that is non-covalently immobilized within the fibrillated microstructure of the polymer membrane. No separate binder is present to fix the catalyst particles in the membrane. Additionally, the catalyst particle is located throughout the thickness of the fibrillated polymer membrane. The supported catalyst particles may be on and/or in the porous fibrillated membrane in an amount greater than about 30%, greater than about 40%, greater than about 50%, greater than about 60%, greater than about 70%, greater than about 80%, or greater than about 90%. In addition, the supported catalyst particles may be on and/or in the porous fibrillated membrane in a range from about 30% to about 98%, from about 30% to about 90% by weight, from about 30% to about 85% by weight, from about 30 to about 80% by weight, from about 30% to about 75% by weight, from about 30% to about 70% by weight, from about 30% to about 65, or from about 30% to about 60% of the fibrillated polymer membrane. In addition, the porous fibrillated polymer membrane has a total porosity from about 20% to about 90%, from about 30% to about 90%, from about 40% to about 90%, from about 50% to about 90%, from about 60% to about 90%, from about 70% to about 90%, or from about 80% to about 90%.

In some embodiments, the supported catalyst particles have a particle distribution based, at least in part, on a D90 value greater than 60 microns. In some embodiments, the supported catalyst particles may have a D90 value greater than 70 microns, greater than 80 microns, greater than 90 microns, or greater than 100 microns. Additionally, the supported catalyst particles may have an upper value of 300 to 500 microns. In some embodiments, the supported catalyst particles have a particle population with a D50 value of 7 microns or more. In some embodiments, the supported catalyst particles have a D10 value of 0.3 microns or more, or 0.5 microns or more. In addition, the mean particle size of the supported catalyst particle is greater than or equal to (i.e. at least) 20 microns, 30 microns, or 40 microns. In some embodiments, the porous fibrillated polymer membrane comprises a volume fraction where at least 40% of the porosity includes a pore size greater than or about 1 micron, greater than or about 2 microns, greater than or about 3 microns, greater than or about 4 microns, greater than or about 5 microns, greater than or about 6 microns, greater than or about 7 microns, greater than or about 8 microns, greater than or about 9 microns, greater than or about 10 microns, greater than or about 11 microns, greater than or about 12 microns, greater than or about 13 microns, greater than or about 14 microns, or greater than or about 15 microns (as measured by mercury porosimetry).

The polymer forming the fibrillated polymer membrane includes or is formed of the immobilize catalyst particles is selected to be inert or resistant to degradation by components present within the fluid stream of intended use. In one embodiment, the polymer forming the fibrillated polymer membrane is a solvent inert or solvent resistant polymer. In particular, the polymer may be both insoluble and inert to the solution in which it is used. In some embodiments, the fibrillated polymer membrane may be perforated. As used herein, the term "perforated" refers to perforations (e.g., holes) spaced throughout some or all of the membrane. The fibrillated polymer membrane may include or be formed of polytetrafluoroethylene (PTFE), expanded polytetrafluoroethylene (ePTFE), poly(ethylene-co-tetrafluoroethylene) (ETFE), ultrahigh molecular weight polyethylene (UHMWPE), polyethylene, polyparaxylylene (PPX), polylactic acid (PLLA), polyethylene (PE), expanded polyethylene (ePE), and any combination or blend thereof. It is to be understood that throughout this disclosure, the term "PTFE" is meant to include not only polytetrafluoroethylene, but also expanded PTFE, modified PTFE, expanded modified PTFE, and expanded copolymers of PTFE, such as, for example, described in U.S. Pat. No. 5,708,044 to Branca, U.S. Pat. No. 6,541,589 to Baillie, U.S. Pat. No. 7,531,611 to Sabol et al., U.S. Pat. No. 8,637,144 to Ford, and U.S. Pat. No. 9,139,669 to Xu et al. The porous fibrillated polymer membrane may also be formed of one or more monomers of tetrafluoroethylene, ethylene, p-xylene, and lactic acid. In at least one embodiment, the porous fibrillated polymer membrane includes or is formed of solvent inert sub-micron fibers of an expanded fluoropolymer.

In some embodiments, the fibrillated polymer membrane is a polytetrafluoroethylene (PTFE) membrane or an expanded polytetrafluoroethylene (ePTFE) membrane having a node and fibril microstructure. The fibrils of the PTFE particles interconnect with other PTFE fibrils and/or to nodes to form a net within and around the supported catalyst particles, effectively immobilizing them. Therefore, in one non-limiting embodiment, the fibrillated polymer membrane may be formed of a network of PTFE fibrils immobilizing and enmeshing the supported catalyst particles within the fibrillated microstructure.

The porous fibrillated polymer membrane may be formed by blending fibrillating polymer particles with the supported catalyst particles in a manner such as is generally taught in U.S. Pat. No. 7,710,877 to Zhong, et al., United States Publication No. 2010/0119699 to Zhong, et al., U.S. Pat. No. 5,849,235 to Sassa, et al., U.S. Pat. No. 6,218,000 to Rudolf, et al., or U.S. Pat. No. 4,985,296 to Mortimer, Jr., followed by uniaxial or biaxial expansion. As used herein, the term "fibrillating" refers to the ability of the fibrillating polymer to form a node and fibril microstructure. The mixing may be accomplished, for example, by wet or dry mixing, by dispersion, or by coagulation. Time and temperatures at which the mixing occurs varies with particle size, material used, and the amount of particles being co-mixed and are can be determined by those of skill in the art. The uniaxial or biaxial expansion may be in a continuous or batch processes known in those of skill in the art and as generally described in U.S. Pat. No. 3,953,566 to Gore and U.S. Pat. No. 4,478,665 to Hubis.

Catalytic Composite as Filtration Medium

FIG. 1 depicts a catalytic filter material 100. The catalytic filter material includes a catalytic composite 102 and a felt batt 104. An upstream direction 106 is defined in terms of the prevailing direction of incoming fluid flow 110, and a downstream direction 108 is defined in terms of a prevailing direction of outgoing fluid flow 112. The felt batt 104 is positioned upstream of the catalytic composite 102, and is operable to collect debris 120 (e.g., dust and the like) from the incoming fluid flow 110. In some embodiments described herein, the catalytic composite perforations therein. The perforated catalytic composite permits fluid to pass readily through the catalytic composite while still interacting sufficiently with the supported catalyst particles durably enmeshed within the porous fibrillated polymer membrane to remediate contamination in the fluid stream. The catalytic material of the catalytic fluoropolymer film is selected to target specific contaminant species. For example, the supported catalyst particles of the catalytic composite 102 can include some combination of, or all of, the catalytic species $TiO_2$, $V_2O_3$, $WO_3$ suitable for catalyzing the reduction or removal of NOx species such as NO, $NO_2$, to water and nitrogen gas, as illustrated in FIG. 1. However, other catalytic materials may be substituted or included that are suitable for conversion of different contaminants, e.g., for remediating carbon monoxide (CO), Dioxin/Furan, ozone ($O_3$), and other contaminants.

In one embodiment, the catalytic composite 102 is perforated, and includes intact portions 116 and perforations 118. The perforations 118 can be formed in the catalytic composite 102 by way of a needling operation and can vary in size depending on the needling operation. Suitable needling operation may include a needle being pressed through the film while puncturing and displacing material, or a needle punching operation in which the needle removes a portion of material. In one embodiment, the catalytic composite 102 is needled and the perforations correspond to a needle diameter from 0.1 mm to 3.0 mm. In another embodiment, the catalytic composite 102 is needle punched, with perforations corresponding to a needle diameter from 0.1 mm to 3.0 mm. In one embodiment, the perforations 118 are spaced throughout the catalytic composite 102. In other embodiments, the perforations 118 are located only in portions of the catalytic composite 102. The perforations, in conjunction with the porosity of the catalytic composite 102, provide the catalytic filter material 100 as a whole with an air permeability suitable for use in filtration applications.

In various embodiments, the perforations 118 are formed in a pattern in the catalytic composite 102. Larger perforations correspond to larger spacing between adjacent perforations, and smaller perforations correspond to closer spacing between adjacent perforations. The perforation pattern may be designed so that airflow through the perforations is consistent across the catalytic composite 102. Some suitable patterns include square patterns, triangular patterns, amorphous patterns, or any other comparable pattern that generally complies with a minimum perforation density. In one embodiment, the patterned perforations are closely spaced.

The catalytic composite 102 promotes catalyzed reduction or removal of target species via an enmeshed supported catalyst in the porous filled polymer membrane. The perforations 118 may reduce the pressure drop (i.e., increase the air permeability) across the catalytic composite 102, rendering it usable in a variety of applications. The passage of fluid through the perforations 118 does not destroy the utility of the catalytic composite 102 as a catalyzing structure, even though a substantial part of the fluid flows through the perforations rather than the unperforated, intact portions 116. In some embodiments, the perforations extend fully through the film, and provide conduits for the passage of a substantial part of the fluid therethrough. Nonetheless, sufficient fluid contacts the porous, fibrillated polymer membrane and interacts with the supported catalysts embedded therein to effectively remediate contaminants in the fluid flow. Not wishing to be bound by theory, it is believed that the assembled combination of the catalytic composite 102 and felt batt 104 are at least partly responsible for the efficacy of the catalytic composite 102 as a catalyzing filter. For example, the catalytic composite 102 and felt batt 104 interact with the interior structure 114 (e.g., staple fibers) of the felt batt 104, allowing the incoming fluid flow 110 to circulate within the felt batt 104 and especially along the interface 122 of the felt batt and the catalytic composite 102. This circulation brings the incoming fluid flow 110 in sufficient contact with the catalytic composite 102 to catalyze the incoming fluid flow and reduce and/or remove chemical contaminants.

The felt batt 104 can include any suitable, porous structure capable of filtering particulate contaminants 120 and/or moderating the incoming fluid flow 110 for introduction to the catalytic composite 102. The felt batt 104 can be formed of any suitable woven or nonwoven having a highly porous interior structure, such as, but not limited, to a staple fiber woven or nonwoven, a PTFE staple fiber woven or nonwoven, a fleece formed from a fluoropolymer staple fiber, or a fluoropolymer staple fiber woven or nonwoven. In one embodiment, the felt batt 104 is a PTFE fiber felt, or a PTFE fiber fleece.

In at least one embodiment, the component layers of the catalytic filter material 100 are connected together by way of the needling or needle-punching operation, i.e., a needle or punch can be pressed through both of the assembled felt batt 104 and catalytic composite 102 in order to locally deform the layers to hold the layers in contact with each other. In general, a needling operation penetrates and deforms the material, while a needle punching operation also removes a small plug of material; but both operations may be referred to as "needling". Layers in the catalytic filter material 100 may also be held together by lamination or applied heat treatment, by adhesives (typically discontinuous adhesives so as to retain porosity), by external connectors, by weaving or other comparable connective means, or by any suitable combination of the above. In one embodiment, the component layers of the catalytic filter material 100 are combined by needling and/or needle punching, followed by a subsequent heat treatment to set the composite and form the catalytic composite. Alternatively, the component layers of the catalytic filter material 100 can be combined by pressing the layers together after the perforations have been applied to the catalytic composite 102, and subsequently heat treating the layered assembly to form the catalytic composite.

In various embodiments, the supported catalyst particles can extend into the pores of the porous fibrillated polymer membrane; and in some embodiments, may extend into the perforations. In various embodiments, the catalytic article can be assembled with, or without, a supportive layer or felt layer as described above. In other words, a catalytic filter material can be produced that contains a perforated porous polymeric membrane with supported catalytic particles enmeshed therein without a support or felt layer.

Figure 2:
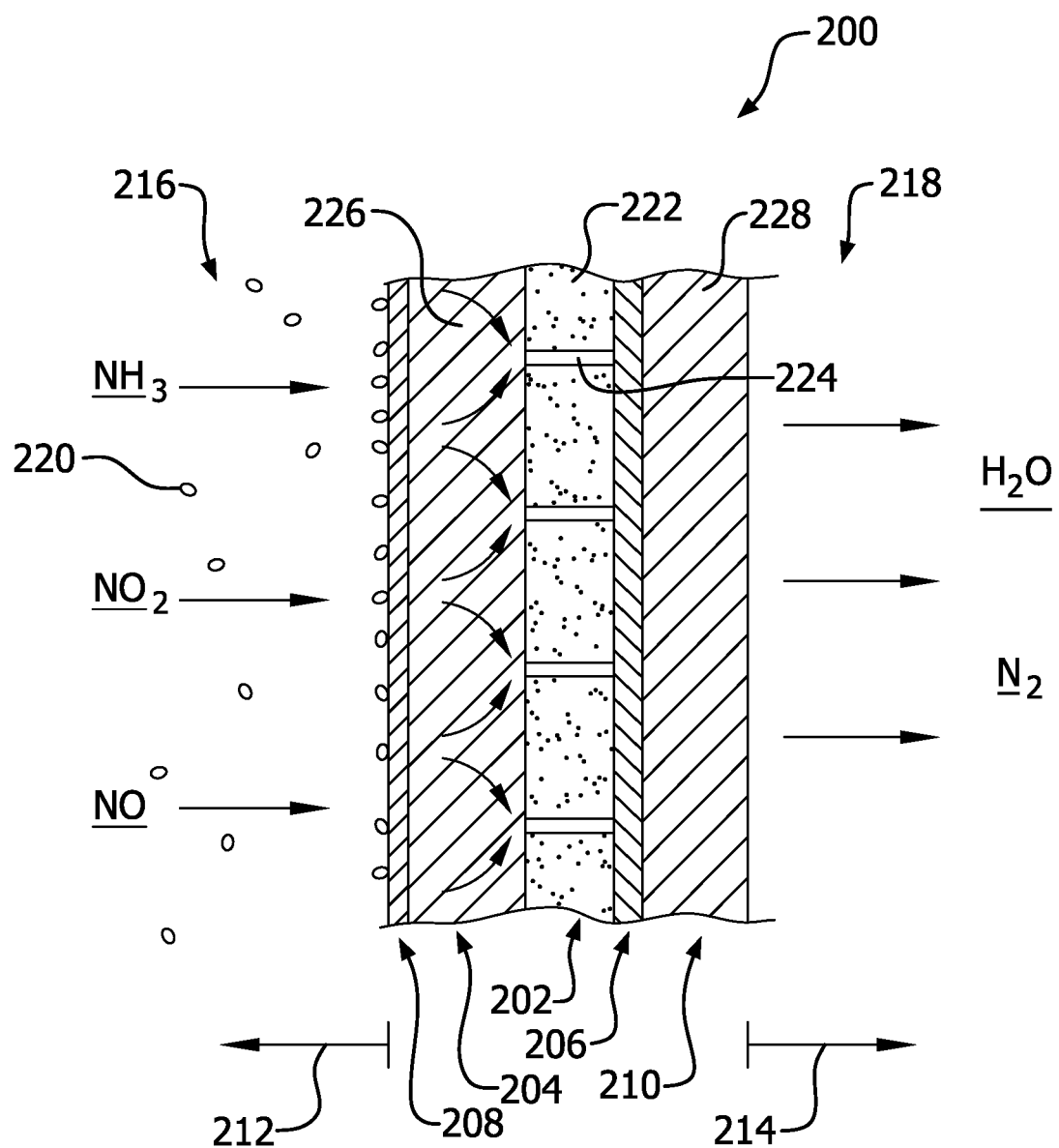
FIG. 2 is a schematic illustration of a second composite filter material that includes a perforated, porous catalytic fluoropolymer film assembled with a scrim, with upstream and downstream felt batts, and a protective porous membrane in accordance with at least one embodiment.

The catalytic filter material 100 can also be combined with additional layers. For example, FIG. 2 illustrates a catalytic filter material 200 that includes additional layers. The catalytic filter material 200 and components thereof can be described in terms of an upstream side 212 facing an incoming fluid flow 216, and a downstream side 214 from which an outgoing fluid flow 218 originates. FIG. 2 shows a catalytic article 202, similar to catalytic article 102 (FIG. 1), layered with a first felt batt 204 and a protective porous membrane 208 in an upstream direction 212 from the fluoropolymer film 202; with a supportive scrim 206 and a second felt batt 210 positioned in a downstream direction 214. The catalytic filter material 200 is capable of filtering particulates 220, which may be suspended in the incoming fluid flow 216 and also to reduce or remove chemical contaminants via a catalyzed reaction at the catalytic article 202 in the catalytic filter composite.

The catalytic article 202 is formed of a perforated, catalytic article 102 as described above with reference to FIG. 1, and includes an intact portion 222 broken by perforations 224. The perforations 224 can be formed in the catalytic article 202 by way of a needling operation; or alternatively, by a needle punching operation, as described above with reference to perforations 118 (FIG. 1). Similar to the catalytic filter material 100 (FIG. 1), the construction of the adjacent catalytic article 202 and first felt batt 204 provide for circulation of the incoming fluid flow 216 within the internal structure 226 of the first felt batt, near the enmeshed catalytic particles of the catalytic article 202, prior to the fluid passing through the catalytic article 202 at the perforations 224 or via pores in the intact portion 222. In accordance with various embodiments, the catalytic article 202 and first felt batt 204 can have similar thicknesses, permeability, and/or material properties as the catalytic article 102 and felt batt 104 described above.

In one embodiment, a protective membrane 208 is positioned on an upstream side of the first felt batt 204, and is capable to capturing or preventing ingress of particulates 220. The protective membrane 208 can capture particulates (e.g., dust, soot, ash, or the like) to prevent entry of particles into the catalytic article 102 or felt batt 104 to prevent or minimize clogging of the perforations 118 of the film, and prevent or minimize fouling of the porous fibrillated polymer membrane that might block access to the supported catalytic particles enmeshed therein. The protective membrane 208 can collect the particulates 220 in a film or cake that can be readily cleaned from the protective membrane 208, thus providing for easy maintenance of the catalytic filter material 200. The protective membrane 208 can be constructed from any suitable porous membrane material, such as but not limited to a porous woven or nonwoven membrane, a PTFE woven or nonwoven, an ePTFE membrane, a fluoropolymer membrane, or the like. The protective membrane 208 may be porous or microporous, and can be connected with the first felt batt 204 by way of laminating, heat treating, discontinuous or continuous adhesives, or other suitable joining method.

In accordance with at least one embodiment, the catalytic article 202 is supported by a scrim 206 that provides structural support without significantly affecting the overall fluid permeability of the catalytic filter material 200. The scrim 206 can be any suitable, porous backing material capable of supporting the catalytic filter material 200. The scrim can be, for example, a fluoropolymer woven or nonwoven, a PTFE woven or nonwoven, or in one specific embodiment, a woven made from ePTFE fibers (e.g. 440 decitex RASTEX® fiber, available from W. L. Gore and Associates, Inc., Elkton, Md.). The scrim 206 may be disposed downstream 214 of the catalytic article 202, e.g., downstream and adjacent the catalytic article 202, or alternatively, downstream and separated from the catalytic article 202 by one or more additional layers. Scrim 206 may be connected to the catalytic article 202 by a needling or needle punching operation. The scrim 206 may also, or alternatively, be connected with the catalytic article 202 by way of a heat treatment, by one or more connectors that press the layers together, or by an adhesive, e.g., a thin adhesive layer (which may be continuous or discontinuous) between the scrim 206 and catalytic article 202, or by any suitable combination of two or more of the above methods, including a needling or needle punching operation. Generally, the scrim 206 has higher air permeability than the catalytic article 202.

In one embodiment, the catalytic filter material 200 can further include a second felt batt 210 positioned in the downstream direction 214 from the catalytic article 202. The second felt batt 210 can have a similar construction and dimensions as the first felt batt 204, e.g., the second felt batt can include or be composed of any suitable woven or nonwoven, such as but not limited to a staple fiber woven or nonwoven, a PTFE staple fiber woven or nonwoven, or a fluoropolymer staple fiber woven or nonwoven. For example, the second felt batt 210 can be a PTFE fiber felt or a PTFE fiber fleece.

The catalytic article 202, scrim 206, and the first and second felt batts 204, 210 may be connected together via a needling or needle punching operation, other methods as described herein with respect to the catalytic article 102 and felt batt 104 of FIG. 1, or a combination of the these techniques. In one embodiment, the catalytic article 202 alone is perforated because the perforations provide for suitable fluid flow across the catalytic article 202, whereas the other layers are generally more permeable to airflow than the catalytic article 202 and do not require any perforation. Alternatively, a sub-combination of the above elements may be perforated by the process of connecting the layers together using needling or needle punching, e.g., the catalytic article 202 and scrim 206, the catalytic article 202 and first felt batt 204, or the catalytic article 202, first felt batt 204 and scrim 206. Some or all of the layers may be further connected via heat treatment, adhesive, or another suitable connection method. The protective membrane 208 may be attached to the remaining layers of the catalytic filter material 200 by adhesion, heat treatment, or another method that does not result in perforations of the protective membrane 208. Alternatively, the protective membrane 208 can be connected with the remaining layers of the catalytic filter material 200 via needling or needle punching.

The catalytic filter materials 100, 200 described above with reference to FIGS. 1 and 2 are illustrative embodiments of catalytic composites utilizing a perforated catalytic article adjacent and downstream of a felt batt, the combination of which is able to direct a contaminated fluid flow along and through the catalytic article to mitigate contamination in the fluid. The various additional components, e.g. the protective membrane 208, scrim 206, and second felt batt 210 described above with reference to FIG. 2 enhance the strength of the catalytic filter material 200, and may provide additional advantages, such as improving the filter properties and/or reducing the penetration of particulates.

Other combinations of the layered elements described above with respect to FIG. 2 are possible and are considered to be within the scope of this disclosure without deviating substantially therefrom, as well as additions of further filtering or catalytic elements therein. For example, one or more of the protective membrane 208, first and second felt batts 204, 210, and scrim 206 may possess catalytic properties. In addition, layers may be added and/or removed between the layers described above with respect to FIG. 2, e.g., additional porous fibrillated polymer membranes, additional felt batt layers, additional catalytic materials such as catalytic felts (e.g., such as, for example, those described in U.S. Pat. No. 5,843,390 to Plinke, et al.), additional supportive layers or scrims, or fewer layers than those described above.

Additional catalytic fluoropolymer film or films similar to the catalytic article 202 can be provided; either upstream or downstream of the catalytic article 202, which contain a different catalyst or group of catalysts in order to provide the catalytic filter material 200 with the ability to catalyze the remediation of multiple specific contaminants within the fluid flow. In one embodiment, an additional porous fibrillated polymer membrane(s), as well as further intermediate felt batts and/or scrims may be provided upstream and downstream, respectively, of each porous fibrillated polymer membrane may be included to separate the porous fibrillated polymer membranes and provide room for circulation between the porous fibrillated polymer membranes.

Figure 3:
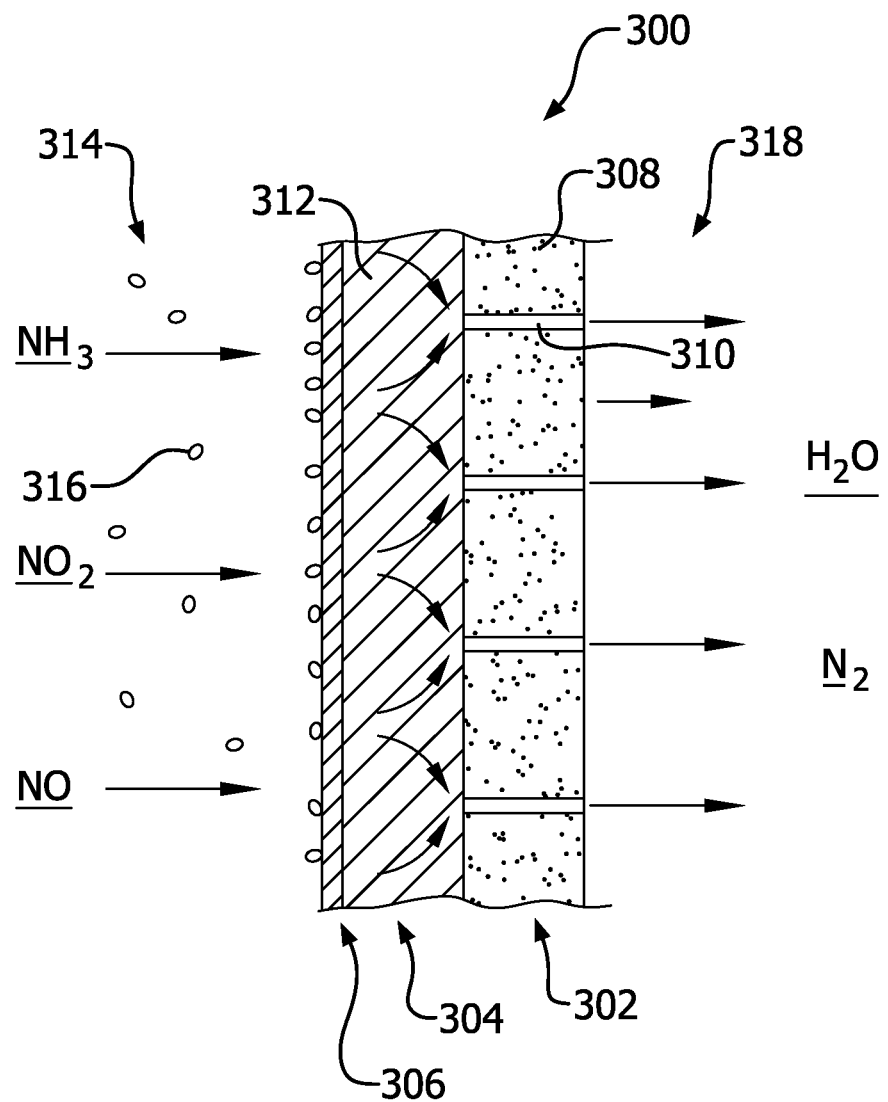
FIG. 3 is a schematic illustration of a third composite filter material that includes a perforated, porous catalytic fluoropolymer film assembled with an upstream felt batt and a protective porous membrane in accordance with at least one embodiment.

FIG. 3 illustrates an alternative catalytic filter material 300 which includes only a catalytic article 302, felt batt 304 positioned upstream of the fluoropolymer film, and protective membrane 306 positioned upstream of the felt batt. Here, the combination of the protective membrane 306, felt batt 304, and catalytic article 302 operate in much the same manner as the membrane 208, first felt batt 204 and catalytic article 202 described above with reference to FIG. 2. The incoming flow of air 314 passes through the protective membrane 306, which at least partly blocks ingress of particulates 316. The incoming flow of air 314 then passes through the felt batt 304, i.e. within the internal structure 312 of the felt batt, where it can interact with and begin to pass through the catalytic article 302.

The catalytic article 302 is perforated, as described above with respect to the catalytic article 102 (FIG. 1), such that one portion of the incoming flow of air 314 passes through the intact portion 308 of the catalytic article and another, generally larger portion through the perforations 310. The perforations 318 can be formed, as described above, via a needling or needle punching operation. Two of the layers, or in some cases all three of the catalytic article 302, felt batt 304, and protective membrane 306, may be needled or needle punched together in a single operation that both forms the perforations 310 and connects the layers. An additional connection step, e.g. a heat treatment or adhesive step, may be used for attaching the layers together.

Figure 4:
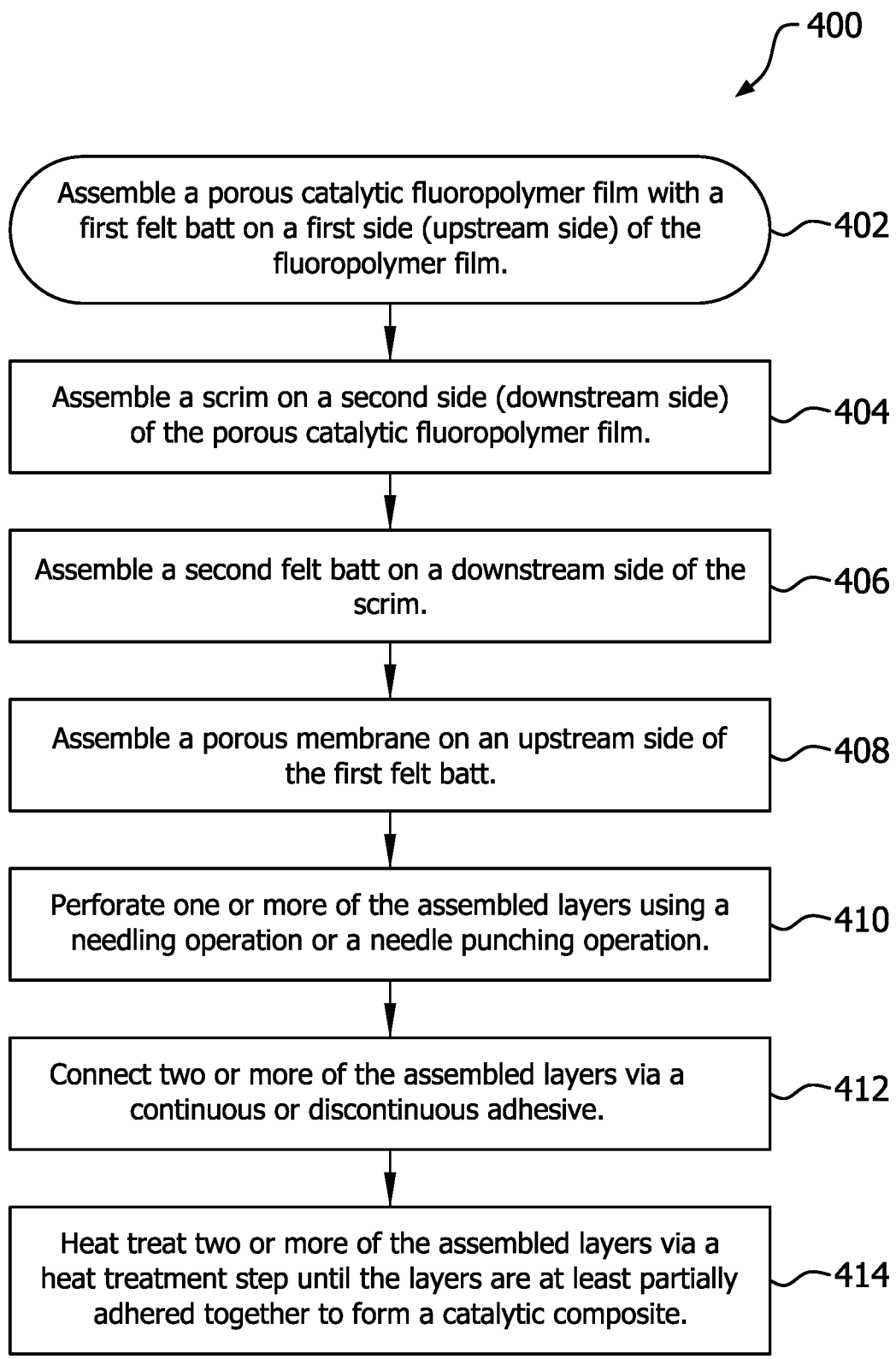
FIG. 4 illustrates a process for assembling a composite filter material in accordance with at least one embodiment.

FIG. 4 describes a process for the assembly of a catalytic composite. For example, as illustrated in FIG. 4, a catalytic composite (such as catalytic filter materials 100, 200, 300, (FIGS. 1-3) can be assembled by layering together a catalytic fluoropolymer film with a felt batt, such as a PTFE staple fiber fleece or similar layer to form a layered assembly (402). This first felt batt is layered on a first, upstream side of the catalytic article. Additional layers may be assembled with the first felt batt and the catalytic article, such as a scrim positioned adjacent a downstream side of the catalytic article opposite the first felt batt (404), and a second felt batt adjacent a downstream side of the scrim (406). A protective, porous membrane layer may be added to the assembly adjacent an upstream side of the first felt batt (408). The assembled layers, or a subset of the assembled layers, may be subjected to a perforating step including needling, needle punching, or both (410). Where only a subset of the assembled layers are perforated, the needling or needle punching step (410) may be performed prior to one or more of the above-described layering steps, e.g., to the catalytic article prior to assembly with a first felt batt, to the combined catalytic article and first felt batt prior to layering with the scrim, to the combined catalytic article, scrim, and first felt batt prior to addition of further layers, etc. The needling or needle punching step can effect a weak adhesion between the layers, which may be suitable alone to connect the layers, or which may be supplemented with the use of adhesives, connectors, or heat treatment to bond the layers to form the catalytic filter material. For example, the assembled layers or a subset of the assembled layers may be further connected together by way of an adhesive (412), which can include a continuous or discontinuous adhesive bonding two or more of the layers. The assembled layers, or a subset of the assembled layers, may be connected together by way of a heat treatment (414) that at least partially adheres the layers together. Note that, as with the perforation step (410), the adhesion and/or heat treatment steps (412, 414) may be performed at an intermediate stage of assembly, e.g., before the addition of the scrim (406), second felt batt (408) or porous protective membrane (408). For example, a layered assembly can be produced that includes the fluoropolymer film, scrim, and first and second felt batts prior to the needling or needle punching step, then layered with a non-perforated protective membrane layer, and then heat treated to form the catalytic filter materials. Alternatively, a layered assembly can be produced that includes all of the above layers, including a protective membrane layer, which is subsequently needled or needle punched and then set via heat treatment to form the catalytic composite; or the heat treatment step (414) may be omitted, or substituted with an adhesion step (412).

Figure 5:
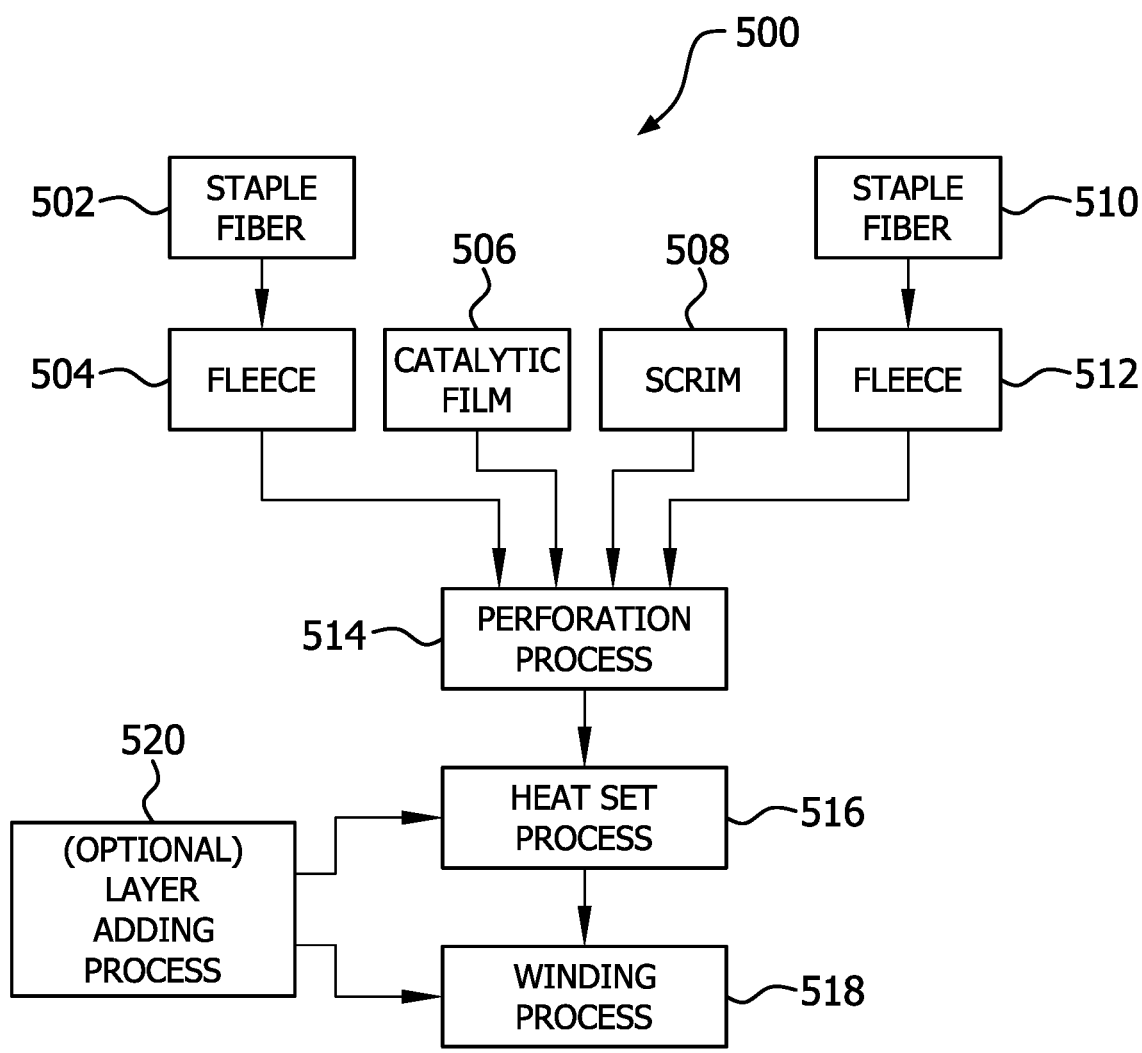
FIG. 5 illustrates specific aspects of a process for assembling a composite filter material as described in FIG. 4 in accordance with at least one embodiment.

A simplified block diagram illustrating a specific assembly process 500 is shown in FIG. 5. According to one embodiment, a first carding operation can be conducted on a staple fiber 502 to produce a first felt batt or fleece 504; and a second carding operation can be conducted on another staple fiber 510 to produce a second felt batt or fleece 512. These felt batts 504, 512 can be layered on either side of a catalytic article 506 and scrim 508 to produce a layered assembly that is subjected to a perforating step, e.g., a needling process or a needle punching process 514. This step results in a catalytic filter material that is connected together and in which the catalytic article 506 is perforated.

The layers can be further connected using a heat set process 516. The heat set materials can then be wound 518, or subjected to other manufacturing steps. A layer adding process 520 may be included to add layers to the catalytic composite, e.g., a protective membrane (such as protective membrane 208 (FIG. 2) or 306 (FIG. 3). The additional layer or protective membrane may be combined with the connected layers after the needle punching/needling process 514, so that the additional layer is not subjected to needling but still attached with the assembly via the heat setting process 516. The additional layer or membrane may be adhered or otherwise attached with the catalytic composite after the heat set process 516 but before winding 518. Alternatively, the additional layer or membrane may be added to the assembled layers prior to the needling or needle punch process 514, and may therefore be perforated as well.

In the embodiments described above, the porous fibrillated polymer membrane effectively distributes the catalyst particles throughout the membrane, in both the length and thickness directions. In addition, the porous nature of the fibrillated polymer membrane allows for efficient and reliable transport of fluid through the catalyst surface. Catalyst loss is minimized because the supported catalyst particles are durably enmeshed within the fibrils of the porous fibrillated polymer membrane.

Test Methods

Particle Size Distribution Measurement

The catalyst powder particle size distributions in Examples 2, 5, and 6 were measured using a Microtrac S3500 laser particle size analyzer. The equipment was setup to measure a volume distribution of 64 channels with an upper edge of 1408 µm and a lower edge of 0.0215 µm. The S3000ALT runmode was used with residuals disabled, the filter enabled, and a runtime of 20 seconds. The particle was set as reflecting with an irregular particle shape, and a fluid reference index of 1.3. The particle solution was prepared by incorporating approximately 0.6 mL of powder into 20 mL of IPA test solution (Iso-Propyl Alcohol with carrier additives of odorless mineral spirits and lecithin). This solution was then sonicated for 30 seconds. Before testing a machine Setzero was performed on the tester, and then the sample solution was added and tested per the settings outlined above. The mean volume diameter, D10, D50, and D90 values used in the examples were taken directly from the output data as captured in the Microtrac test report. The volume % of particles under 9 µm was determined by interpolating the cumulative volume distribution % value between the 7.78 µm and 9.25 µm channels.

Catalyst powder particle size distribution in Example 1 was measured optically using a Horiba LA-350 particle size analyzer (Horiba Inc., Hsinchu, Taiwan). $TiO_2$ in water was selected as the type of sample to analyze. Two kinds of aqueous solutions were used in the measurement. Solution 1 was prepared by adding 0.4 gram of TKPP (Tetrapotassium diphosphate) in 1 liter of water. Solution 1 was used to rinse the particle size analyzer and performing blank measurement. Solution 2 was prepared by adding 0.4 gram of TKPP, and 0.75 mL of Photoflow wetting agent (Kodak Photo-Flo 200 Solution; Eastman Kodak, Rochester, NY) in 1 liter of water. Solution 2 was used as dispersion medium for catalyst powder. To disperse the catalyst powder, approximately 20 mL of solution 2 was added in to 0.25 g of catalyst powder. After sonication for 5 minutes, the catalyst powder dispersion was slowly added to the sampling bath in the particle size analyzer using a micropipette to get transmittance in range of 80-90%. Particle size distribution measurements were conducted when the real time distribution window was stable.

Mercury Porosimetry Testing

Porosity measurements were performed on a Micromeritics AutoPore V mercury porosimeter (Micromeritics, Norcross, Ga., USA), using Micromeritics MicroActive software version 2.0. Quadruple Distilled Virgin Mercury-99.9995% purity (Bethlehem Apparatus, Bethlehem, PA) was used as received for tests. Tests used a solid type penetrometer with a bulb volume of 5 $cm^3$ and a stem volume of 0.392 $cm^3$ (SN: 07-0979). Pieces of the composite samples were cut into 1 cm×2 cm strips and enough of these strips were weighed on an analytical balance to provide a total mass of approximately 0.25 g. After noting the mass, the sample pieces were placed in the penetrometer.

The test parameters were as follows: (1) the penetrometer was placed into the low pressure port on the AutoPore and evacuated to 50 microns Hg, followed by 5 min unrestricted evacuation; (2) the penetrometer was then filled with mercury at 0.5 psia (~3.5 kPa) and equilibrated for 10 seconds; pressure was subsequently applied to the capillary using nitrogen in steps up to 30 psia (~0.21 MPa), equilibrating for 10 seconds at each step prior to determining the intrusion volume via the standard capacitance measurement with the penetrometer capillary; (3) the penetrometer was removed from the low pressure port after returning to atmospheric pressure and then weighed to determine the amount of mercury added; (4) the penetrometer was subsequently placed into the high pressure port on the AutoPore and the pressure was again increased in a series of steps up to approximately 60,000 psia (~413.7 MPa) allowing 10 sec at each step to equilibrate prior to intrusion volume measurements.

The intrusion volume V at any pressure is determined through a capacitance measurement using the pre-calibrated capillary (i.e., a cylindrical capacitor where the outer contact is the metallized coating on the external surface of the glass capillary, the inner contact is the liquid mercury, and the dielectric is the glass capillary). The total intrusion volume divided by the sample mass gives the specific intrusion volume (in mL/g).

The volume occupied by the sample was calculated at the two extreme target pressures, namely, 0.5 psia (~3.5 kPa) and 60,000 psia (~413.7 MPa). Since the penetrometer has a known calibrated volume, the difference between this volume and the mercury volume (determined from the mass increase after mercury addition at low pressure and the density of mercury) yields the volume of the sample including any pores. Dividing the mass of the sample by the volume at this low pressure provides the bulk density of the sample. At high pressure, where mercury has been pushed into the pores by an amount given by the intrusion volume, the skeletal density can be approximated by dividing the sample mass by the adjusted sample volume (e.g., low pressure volume minus total intrusion volume).

Total Pore Area

The total pore area was determined through a series of intermediate calculations. First, the diameter of the pores being filled at a given pressure was calculated using the Washburn equation:

$$D_i = \frac{-4\gamma\cos\theta}{P_i}$$

where $D_i$=pore diameter at the ith pressure point, $\gamma$=surface tension, $\theta$=contact angle and $P_i$=pressure. The mean diameter for the ith point is then taken to be:

$$Dm_i=(D_i+D_{i-1})/2$$

The incremental specific intrusion volume for the ith point was calculated from the total intrusion volume taken at each point (Ii):

$$Ii_i=I_i-I_{i-1}$$

Finally, the incremental specific pore area for the ith point was calculated from the incremental intrusion volume and the mean diameter from:

$$Ai_i=(4\times Ii_i)/Dm_i$$

The total (i.e., cumulative) specific pore area for the ith point was then calculated as:

$$A_i=Ai_i+Ai_{i-1}+\ldots+Ai_j.$$

Bulk Density

The bulk density of the sample is the density of the solid including all open pores and internal void volume. The bulk density was calculated by dividing the sample mass by the low pressure mercury intrusion volume. Sample mass was determined by weighing on an analytical balance of +/−0.01 mg sensitivity.

$$\text{Bulk Density}=M/(V_{Low\ Pressure})$$

Skeletal Density

The skeletal density is the density of a solid calculated by excluding all open pores and internal void volume. The skeletal density was calculated by dividing the sample mass by the adjusted sample volume (low pressure volume minus total intrusion volume). The sample mass was determined by weighing on an analytical balance of +/−0.01 mg sensitivity.

$$\text{Skeletal Density}=M/((V_{Low\ Pressure})-(V_{High\ Pressure}))$$

where $V_{Low\ Pressure}$ is volume of the sample at 0.5 psia (~3.5 kPa) and $V_{High\ Pressure}$ is total intrusion volume at 60,000 psia (~413.7 MPa).

Total Porosity

The total porosity within the substrate is simply the void volume of the sample divided by the total volume of the sample. This can be calculated as:

%Porosity=100*(total intrusion volume at 60,000 psia (~413.7 MPa))/(volume of the sample at 0.5 psia (~3.5 kPa)).

Thickness

Membrane thickness was measured by placing the membrane between the two plates of a Kafer FZ1000/30 thickness snap gauge (Käfer Messuhrenfabrik GmbH, Villingen-Schwenningen, Germany). The average of the three measurements was used.

EXAMPLES

Example 1

Preparation and Evaluation of Composite Membranes

A series of polytetrafluoroethylene (PTFE) plus catalyst composite membranes were prepared using the general dry blending methodology taught in U.S. Pat. No. 7,791,861 to Zhong et al. to form composite tapes that were then uniaxially expanded according to the teachings of U.S. Pat. No. 3,953,566 to Gore. The resulting porous fibrillated expanded PTFE (ePTFE) composite membranes included supported catalyst particles durably enmeshed and immobilized within the ePTFE node and fibril matrix. Table 1 outlines the details of the various ePTFE composite membranes.

TABLE 1 ePTFE Composite Membranes

| Sample # | Filler Loading, % by weight | Filler size | Final Thickness (μm) | Total Porosity from Mercury Porosimetry (%) | Bulk Density from Mercury Porosimetry (g/cm³) | NO$_x$ Reaction efficiency (%) | Catalyst mass per area, (g/m²) |
|---|---|---|---|---|---|---|---|
| 1 | 30 | Small | 758 | 68.7 | 0.82 | 34.9 | 130.1 |
| 2 | 30 | Small | 728 | 61.3 | 0.49 | 36.4 | 127.2 |
| 3 | 30 | Small | 741 | 72.3 | 0.81 | 36.5 | 126.0 |
| 4 | 30 | Small | 724 | 70.3 | 1.04 | 26.4 | 96.3 |
| 5 | 50 | Large | 842 | 68.6 | 0.63 | 65.8 | 240.6 |
| 6 | 30 | Large | 775 | 81 | 0.73 | 47.5 | 126.7 |
| 7 | 50 | Large | 851 | 77.1 | 0.79 | 63.8 | 249.6 |
| 8 | 30 | Large | 754 | 82.3 | 0.78 | 51.1 | 131.9 |
| 9 | 50 | Large | 800 | 76.3 | 0.68 | 62.6 | 232.9 |
| 10 | 50 | Large | 830 | 54.8 | 0.55 | 62.1 | 224.5 |
| 11 | 30 | Large | 779 | 73.9 | 0.71 | 50.9 | 143.0 |
| 12 | 30 | Small | 732 | 50.7 | 0.51 | 35.9 | 122.5 |
| 13 | 50 | Large | 851 | 77.6 | 0.76 | 63.2 | 239.4 |
| 14 | 50 | Large | 796 | 85.8 | 0.84 | 58.8 | 181.3 |
| 15 | 30 | Large | 758 | 53.6 | 0.52 | 46.7 | 118.8 |
| 16 | 30 | Large | 770 | 67.9 | 0.78 | 51.7 | 139.4 |
| 19 | 50 | Small | 707 | 53.2 | 0.60 | 49 | 194.9 |
| 20 | 50 | Small | 749 | 72.4 | 0.91 | 53.2 | 229.2 |
| 22 | 50 | Small | 741 | 43.3 | 1.00 | 46.7 | 180.0 |

TABLE 1-continued ePTFE Composite Membranes

| Sample # | Filler Loading, % by weight | Filler size | Final Thickness (μm) | Total Porosity from Mercury Porosimetry (%) | Bulk Density from Mercury Porosimetry (g/cm³) | NO$_x$ Reaction efficiency (%) | Catalyst mass per area, (g/m²) |
|---|---|---|---|---|---|---|---|
| 23 | 30 | Large | 770 | 60.5 | 0.81 | 52.1 | 145.2 |
| 24 | 30 | Large | 758 | 71.1 | 0.87 | 55.2 | 143.4 |

1 = filler is vanadium pentoxide on titanium dioxide particles

Figure 6:
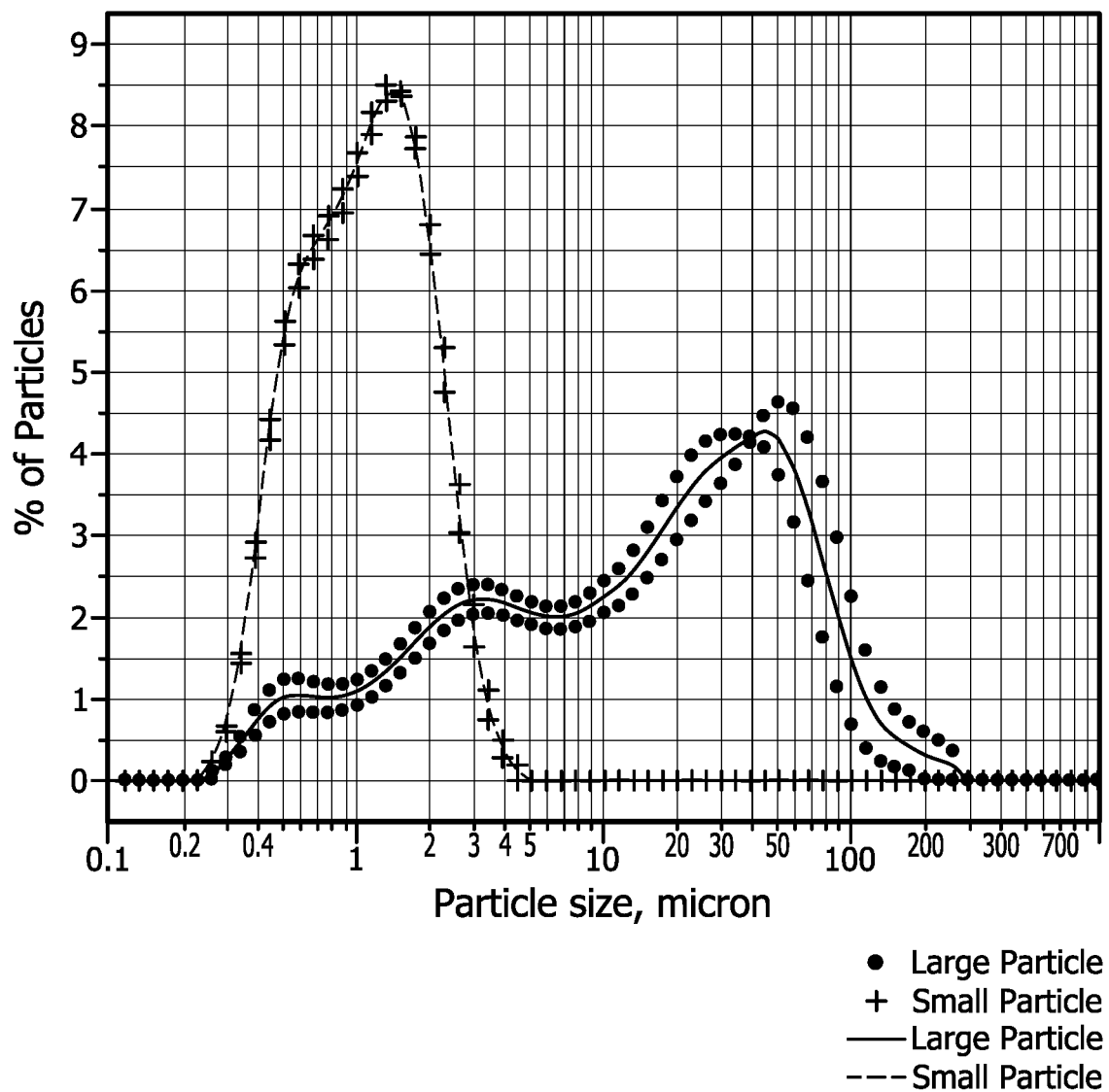
FIG. 6 is a graphical illustration showing the particle size distributions of two catalyst size distributions ("small" and "large") in accordance with at least one embodiment.

The catalytic composites included either 30% by weight or 50% by weight vanadium pentoxide on titanium dioxide particles (CRI Catalyst Company, a division of Royal Dutch Shell, The Hague, Netherlands) and filler particles of two different particle size variants designated as "large" and "small". Distributions were measured via the Horiba instrument described above in the Test Methods Section. Raw particle size distribution data output by the Horiba instrument is shown in FIG. 6.

The "small" catalyst size variant was unimodal and a weighted distribution of the raw particle size data yielded the statistics shown in Table 2.

TABLE 2

Particle distribution statistics for the "small" catalyst variant

| Quantiles | | | Summary Statistics | |
|---|---|---|---|---|
| (%) | | (μm) | | (μm) |
| 100 | Maximum | 4.472 | Mean | 1.2397866 |
| 99.5 | | 4.472 | Std. Dev. | 1.5259099 |
| 97.5 | | 4.4153 | Std. Error Mean | 0.1078981 |
| 90 (D90) | | 3.409 | Upper 95% Mean | 1.4575339 |
| 75 | Quartile | 2.269 | Lower 95% Mean | 1.0220394 |
| 50 (D50) | Median | 1.005 | N | 43 |
| 25 | Quartile | 0.51 | | |
| 10 (D10) | | 0.3132 | | |
| 2.5 | | 0.259 | | |
| 0.5 | | 0.259 | | |
| 0.0 | Minimum | 0.259 | | |

The mean particle size was approximately 1.24 μm with a standard deviation of 1.53 μm.

The "large" catalyst size variant appeared multimodal and a weighted distribution of the raw particle size data yielded the statistics shown in Table 3.

TABLE 3

Particle size distribution statistics for the "large" catalyst variant

| Quantiles | | | Summary Statistics | |
|---|---|---|---|---|
| (%) | | (μm) | | (μm) |
| 100 | Maximum | 262.376 | Mean | 28.911649 |
| 99.5 | | 262.376 | Std. Dev. | 49.778896 |
| 97.5 | | 213.81062 | Std. Error Mean | 3.5198995 |
| 90 (D90) | | 116.21 | Upper 95% Mean | 35.895894 |
| 75 | Quartile | 43.512 | Lower 95% Mean | 21.927405 |
| 50 (D50) | Median | 7.697 | N | 100 |
| 25 | Quartile | 1.366 | | |
| 10 (D10) | | 0.51 | | |
| 2.5 | | 0.296 | | |
| 0.5 | | 0.259 | | |
| 0.0 | Minimum | 0.259 | | |

The mean particle size was approximately 28.9 μm with a standard deviation of approximately 49.8 μm.

FIG. 6 shows the actual particle size distributions of the "large" and "small" variants as measured by the Horiba instrument described above.

NOx Reaction Efficiency

A hand perforation tool was used to manually perforate small holes in the catalytic composite to enable air permeability before the catalytic performance test was conducted. The catalytic composite membranes were tested for catalytic NO$_x$ reaction efficiency from a simulated flue gas. Briefly, squares 4.5" inch (~1.77 cm)×4.5" inch (~1.77 cm) of the catalytic membrane (e.g. samples) were placed in a sample holder located within a reaction chamber. The samples were exposed to an N$_2$ balanced simulated flue gas at 200° C. The simulated flue gas contained 360 ppm NO, 340 ppm NH$_3$, 6 vol % O$_2$ with a total flowrate of 4.2 L/min. In order to determine NO$_x$ reaction efficiency, the upstream and downstream concentrations (i.e., relative to the catalytic membrane) of both NO and NH$_3$ were monitored with a MKS MULTI-GAS™ 2030D FTIR analyzer (MKS Instruments, Andover, MA). NO$_x$ reaction efficiency was calculated according to the following formula where 'NO' indicates the concentration of NO in the respective stream.

$$NO_x \text{ removal efficiency } (\%) = \frac{NO_{in} - NO_{out}}{NO_{in}} \times 100\%$$

Each catalytic composite membrane's catalyst mass per area (MPA) was calculated. Catalyst MPA represents the mass of catalytic vanadium pentoxide on titanium dioxide per unit area (calculated by dividing the mass of a 0.1 m² circular sample (cut using a PS 100 punching machine system; Karl Schröder KG, Weinheim, Germany)) by the known punch area and multiplying the resultant number by the mass fraction of catalyst present in the catalytic composite membrane).

Figure 7:
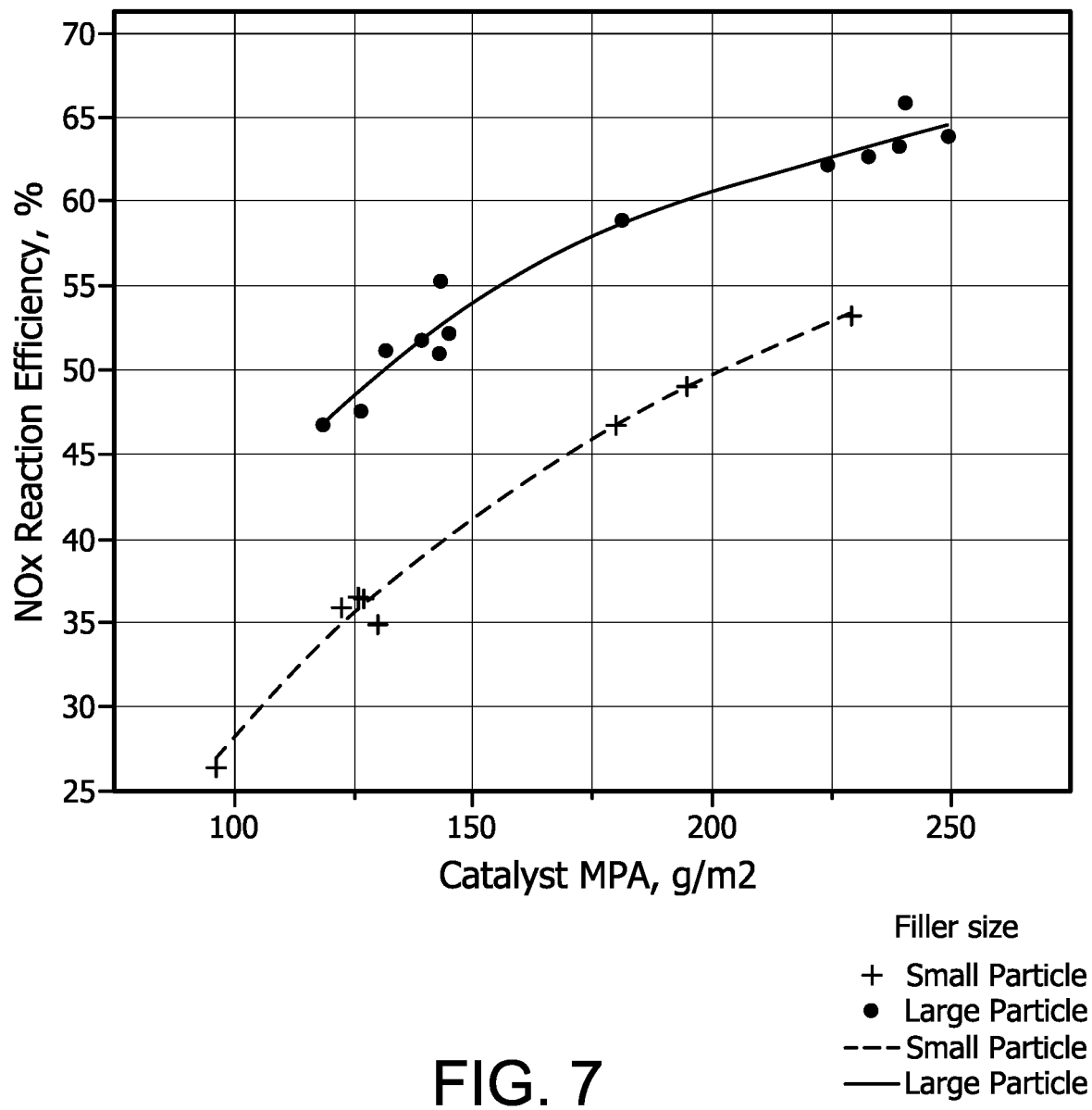
FIG. 7 is a graphical illustration showing catalyst mass per area vs. $NO_x$ reaction efficiency using two different catalyst size distributions ("small" and "large") in accordance with at least one embodiment.
Figure 8:
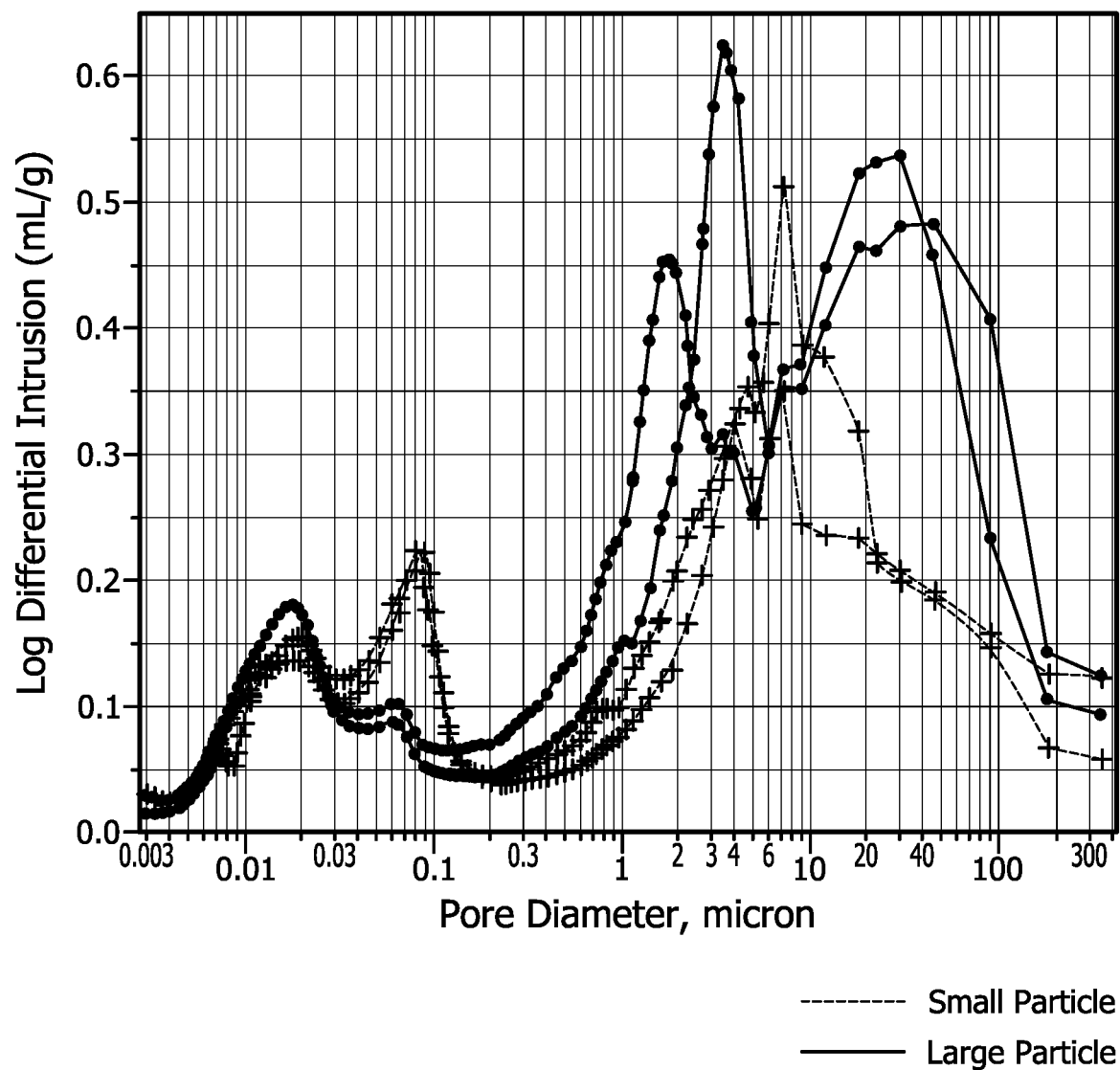
FIG. 8 is a graphical illustration of a mercury porosimetry plot showing average pore diameter vs. log differential intrusion (mL/g) for representative "large" and "small" particle catalytic composite tapes in accordance with at least one embodiment.

FIG. 7 illustrates the higher performance obtained by utilizing the "larger" catalyst particles. At a constant catalyst mass per area (MPA), the large particle catalytic composite membranes showed an approximately 10-15% higher reaction efficiency as compared to "small" particle catalytic composite tapes. Mercury porosimetry measurements were conducted as described above in the Test Methods section. Analysis via mercury porosimetry showed that the membranes prepared with the "large" catalytic filler particles generally demonstrated a higher number of pores in the 1-100 μm diameter size range, indicating that the catalytic particle size influenced structure of the membrane and catalytic efficiency. FIG. 8 illustrates the mercury porosimetry plot showing the number of pores vs pore diameter for representative "large" and "small" particle catalytic composite membranes.

Figure 9A:
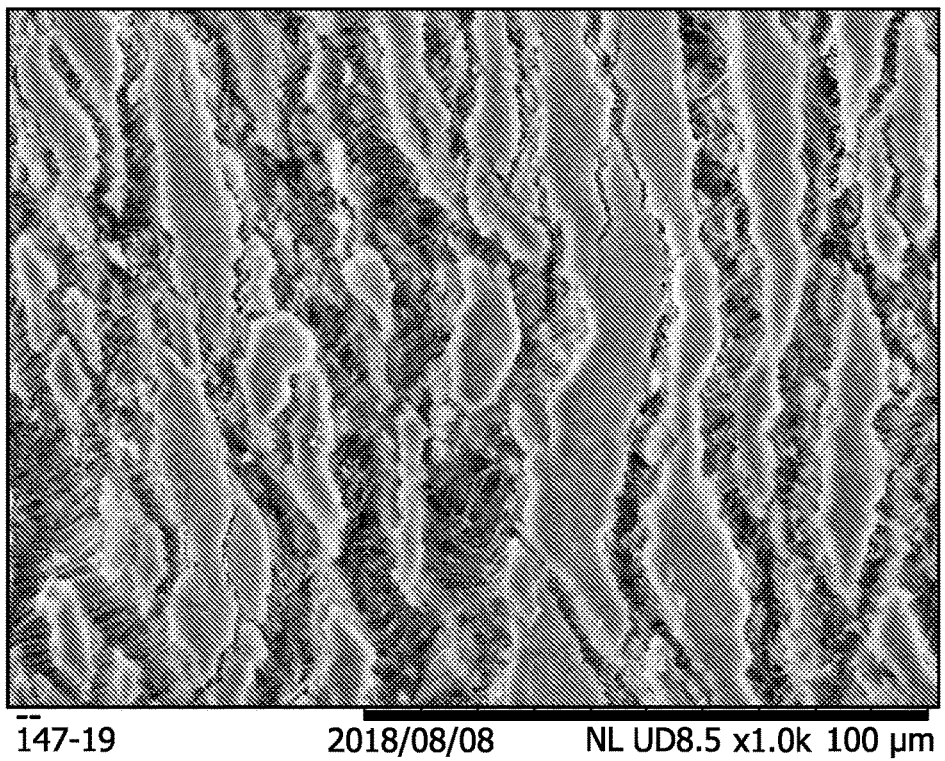
FIG. 9A is a scanning electron microscope (SEM) image of a composite tape prepared using the "small" particle size distribution catalyst particles in accordance with at least one embodiment.
Figure 9B:
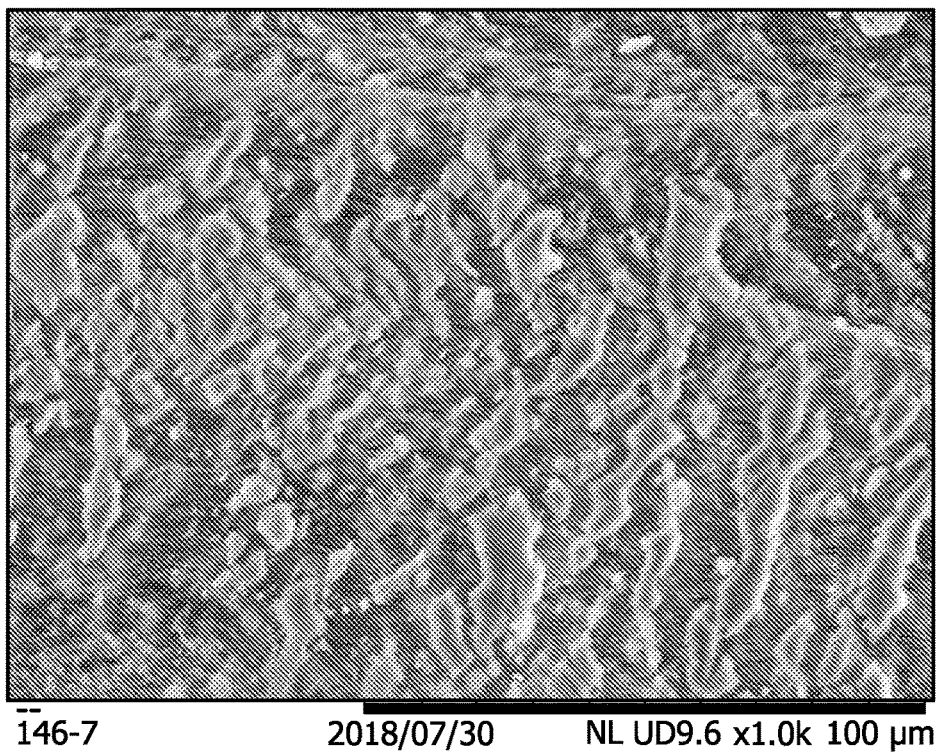
FIG. 9B is an SEM image of a composite tape prepared using the "large" particle size distribution catalyst particles in accordance with at least one embodiment.

FIGS. 9A and 9B illustrate that catalytic composites prepared with "large" catalytic filler particles generally had smaller nodes, which increased the exposure of the catalytic filler particles to the reactant gases.

Example 2

Catalytic Composite Membrane Preparation and Evaluation for NOx Reaction Efficiency as a Function of Catalyst Particle Size Five polytetrafluoroethylene (PTFE) plus catalyst composite membranes were prepared using the general dry blending methodology taught in U.S. Pat. No. 7,791,861 to Zhong et al. to form composite tapes that were then uniaxially expanded according to the teachings of U.S. Pat. No. 3,953,566 to Gore. The resulting porous fibrillated expanded PTFE (ePTFE) composite membranes included supported catalyst particles durably enmeshed and immobilized within the ePTFE node and fibril matrix. The properties of each sample are provided in Table 4. The particle size was measured using the Microtrac method described above in the Test Methods section.

$(NO_{out})$ were monitored with a MKS MULTI-GAS™ 2030D FTIR analyzer (MKS Instruments, Andover, MA). $NO_x$ reaction efficiency was calculated according to the following formula where 'NO' indicates the total concentration of NO in the respective stream.

$$NO_x \text{ reaction efficiency}(\%) = (NO_{in} - NO_{out})/NO_{in} \times 100\%.$$

Figure 11:
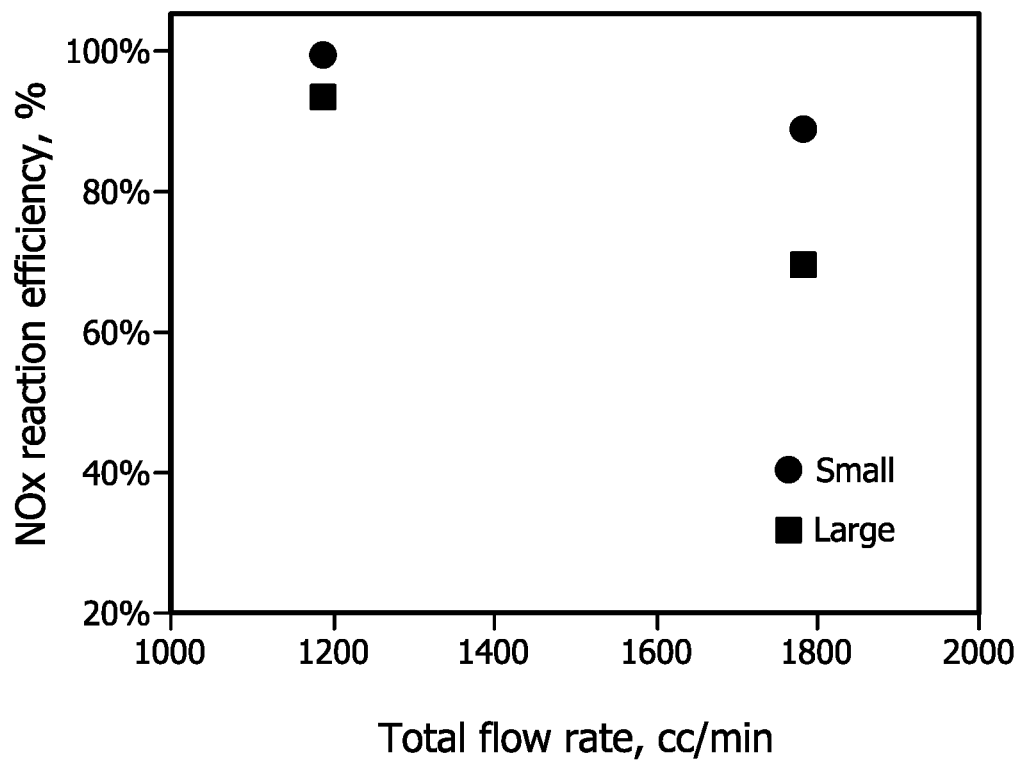
FIG. 11 is a graphical illustration of a total flow rate vs. NOx reaction efficiency for representative "large" and "small" particle catalytic composite tapes in accordance with at least one embodiment.

As shown in FIG. 11, samples that included the smaller particle size powder catalyst had higher NOx reaction (removal) efficiency relative to the larger particle size powder catalyst at each flow rate tested.

Example 4

Surface Area of ePTFE Composite Membranes

Brunauer-Emmett-Teller (BET) surface area measurements of the ePTFE composite membranes described in Example 1 were derived from $N_2$ sorption by a Quantachrome NOVA® surface area analyzer (Anton Paar GmBH, Graz, Austria). All of the ePTFE composite membrane samples were degassed at 150° C. under vacuum for 2 hours. The surface area was calculated using BET method (Brunauer et al., (1938) *JACS* 60 (2): 309-319). In this approach, P/P0 in the range of 0.05 to 0.35 was applied.

TABLE 4

| Sample No. | Catalyst[1] wt % | PTFE wt % | Catalyst Mean Particle Size μm | Catalyst Maximum Particle size μm | Average Final thickness (μm) | % of Full Density | NOx Reaction efficiency (%) | Catalyst Mass per Area (g/m²) |
|---|---|---|---|---|---|---|---|---|
| 1 | 33 | 67 | 0.9 | 1.9 | 1015 | 33 | 45 | 209 |
| 2 | 50 | 50 | 0.9 | 1.9 | 1145 | 20 | 53 | 268 |
| 3 | 49 | 51 | 0.9 | 1.9 | 1145 | 33 | 61 | 327 |
| 4 | 33 | 67 | 6.5 | 37 | 1015 | 50 | 48 | 207 |
| 5 | 43 | 57 | 40.4 | 296 | 1195 | 25 | 69 | 279 |

[1] = Vanadium pentoxide on TiO2 support

Figure 10:
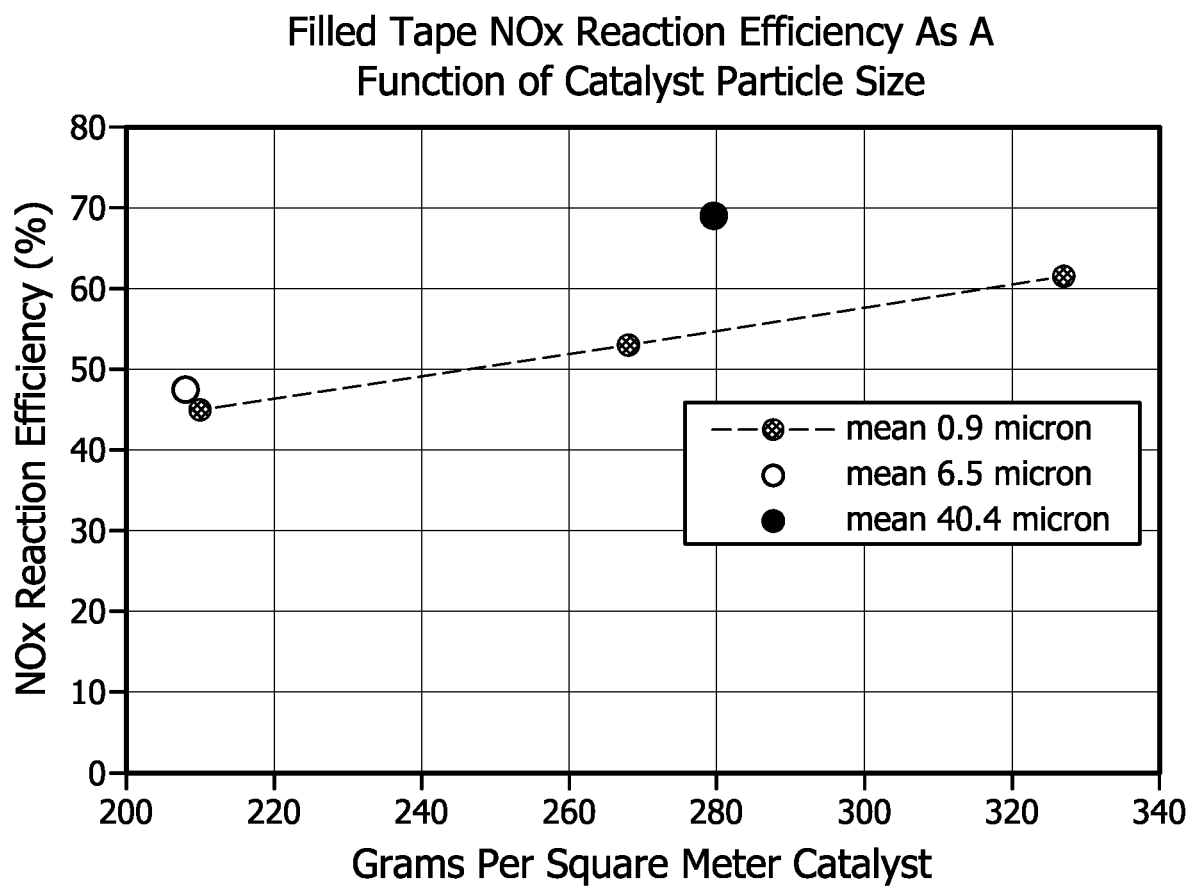
FIG. 10 is a graphical illustration showing catalyst mass per area vs. $NO_x$ reaction efficiency using several different catalyst size distributions in accordance with at least one embodiment.

A hand perforation tool was used to manually perforate small holes in the catalytic composite to enable air permeability before the catalytic performance test was conducted using the method described in Example 1. The membranes were tested for NOx reaction efficiency using the method described in Example 1. Membrane efficiency results were plotted against grams per square meter of catalyst shown in the FIG. 10, where it can be seen that there is a considerable boost in performance when the 40 micron mean particles were used over the 0.9 or 6.5 micron mean particle sizes.

Example 3

NOx Reaction Efficiency of Catalyst Powders

Figure 12:
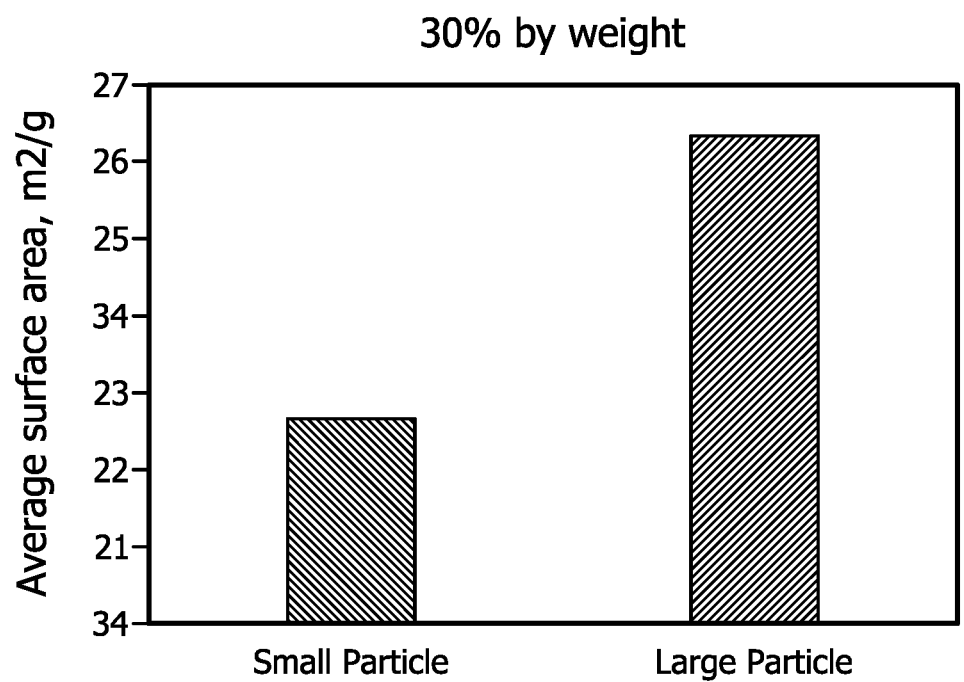
FIG. 12 is a graphical illustration of average surface area for representative "large" and "small" particle catalytic composite tapes at 30% by weight filler in accordance with at least one embodiment.

The NOx reaction on "small" and "large" catalyst powders in Example 1 was carried out in a fixed-bed quartz flow reactor at 200° C. Catalyst powder (0.2 g) was mixed with 1.0 g PTFE powder before placed in the reactor. The feed gas mixture contained 360 ppm NO, 340 ppm $NH_3$, 6 vol % $O_2$ and $N_2$ as balance. The NOx reaction was measured with a total flow rate of 1.19 and 1.78 L/min. In order to determine NOx reaction efficiency, the upstream (i.e., the concentration of NO entering into the chamber before exposure to the filter medium; $NO_{in}$) and downstream concentration of NO For ePTFE composite membranes with 30% by weight filler loading and "small" filler size, the average surface area was obtained by adding the surface area of samples 1, 2, 3, and 12 (Table 1) and dividing by four. For ePTFE composite membranes with 30% by weight filler loading and "large" filler size, the average surface area was obtained by adding the surface area of samples 6, 8, 15, 16, 23, and 24 (Table 1) and dividing by six. The data is shown in FIG. 12. It was concluded that the average surface area was greater for the ePTFE composites that included the "larger" catalyst particles at 30% by weight filler loading.

Figure 13:
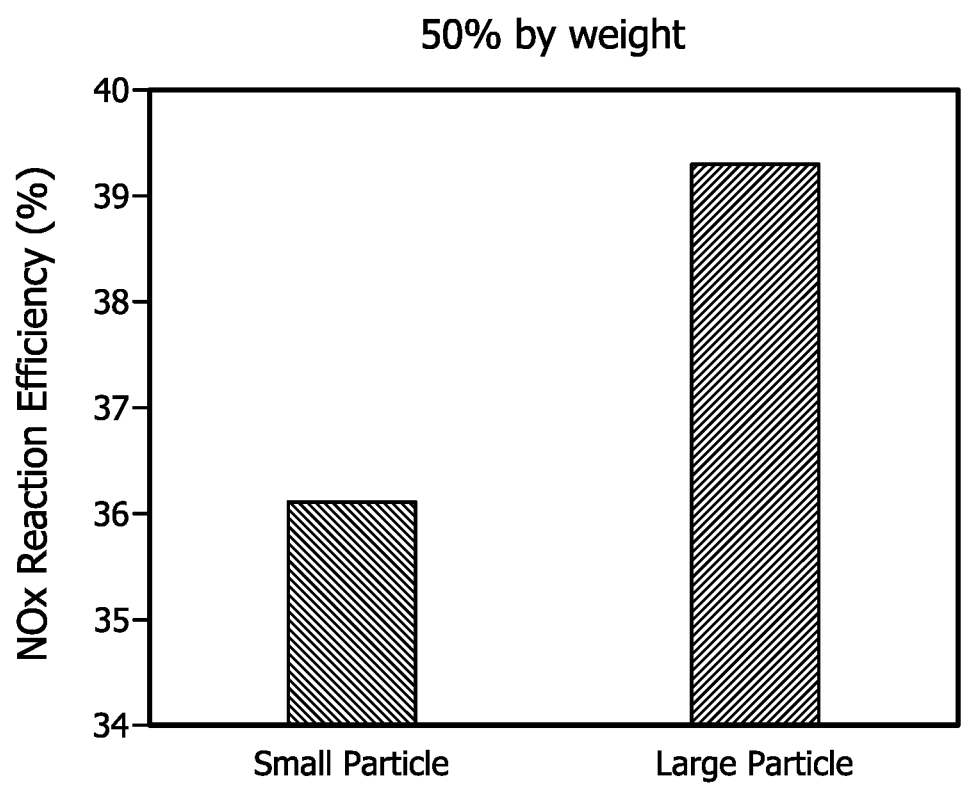
FIG. 13 is a graphical illustration of average surface area for representative "large" and "small" particle catalytic composite tapes at 50% by weight filler in accordance with at least one embodiment.

For ePTFE composite membranes with 50% by weight filler loading and "small" filler size, the average surface area was obtained by adding the surface area of samples 19, 20, and 22 (Table 1) and dividing by three. For ePTFE composite membranes with 50% by weight filler loading and "large" filler size, the average surface area was obtained by adding the surface area of samples 5, 7, 9, 10, 13, and 14 (Table 1) and dividing by six. The data is shown in FIG. 13. It was determined that the average surface area was greater for ePTFE composites that included the "larger" catalyst particles at 50% by weight filler loading.

Example 5

Effect of % Large Particle Batch by Weight and Volume on NOx Efficiency

For this example, catalytic powder was taken from two lots, one with a mean particle size of 1-2 micron (lot M) and another with a mean particle size of 69 microns (lot X), with the particle size distribution of both samples measured using the Microtrac system described in the Test Method section above. Additionally, for lot X, 85% of the particles were larger than 9 microns, with a mean particle size of 69 micron, a D90 of 149 microns, and a maximum particle size of 500 microns. The bulk density of each lot was measured by weighing a 300 cc sample taken from each lot in a cup. It was determined that the bulk density of the 1-2 micron catalyst lot (lot M) was approximately 40 g/cc (sample size n=7), while the 69 micron mean particle size (lot X) was approximately 100 g/cc (sample size n=7), or roughly 2.4 times the bulk density of the first lot (lot X). From these two lots (lot X and lot M), new batch formulations of "large" particle filler were made with progressively greater levels of the 69 micron mean particle size lot (lot X), so that the following batches were created as shown in Table 5.

TABLE 5

Batch number formulations of % large particle filler by weight and volume

| Batch Number | Larger particle batch of filler by weight | % Larger particle batch of catalyst filler by volume |
|---|---|---|
| 1 | 0 | 0 |
| 2 | 5 | 2 |
| 3 | 10 | 4 |
| 4 | 20 | 9 |
| 5 | 33 | 17 |
| 6 | 50 | 29 |
| 7 | 67 | 46 |
| 8 | 100 | 100 |

Each batch was mixed with PTFE resin at a ratio of 1 part catalytic power to two parts PTFE by weight, or 33% filler by weight, agglomerated, and converted into an ePTFE tape using the methods described in the previous Examples as well as by the methodology described in U.S. Pat. No. 7,791,861 to Zhong et al. The tapes were then uniaxially expanded 3:1 according to the teachings of U.S. Pat. No. 3,953,566 to Gore to form an ePTFE membrane. NOx efficiency of the ePTFE membrane was measured according the methods set forth in Example 1 for each membrane. Additionally, replicate membranes containing 1-2 micron size particles that were previously made and tested for NOx efficiency were also included in the data set shown in FIGS. 14 and 15.

Figure 14:
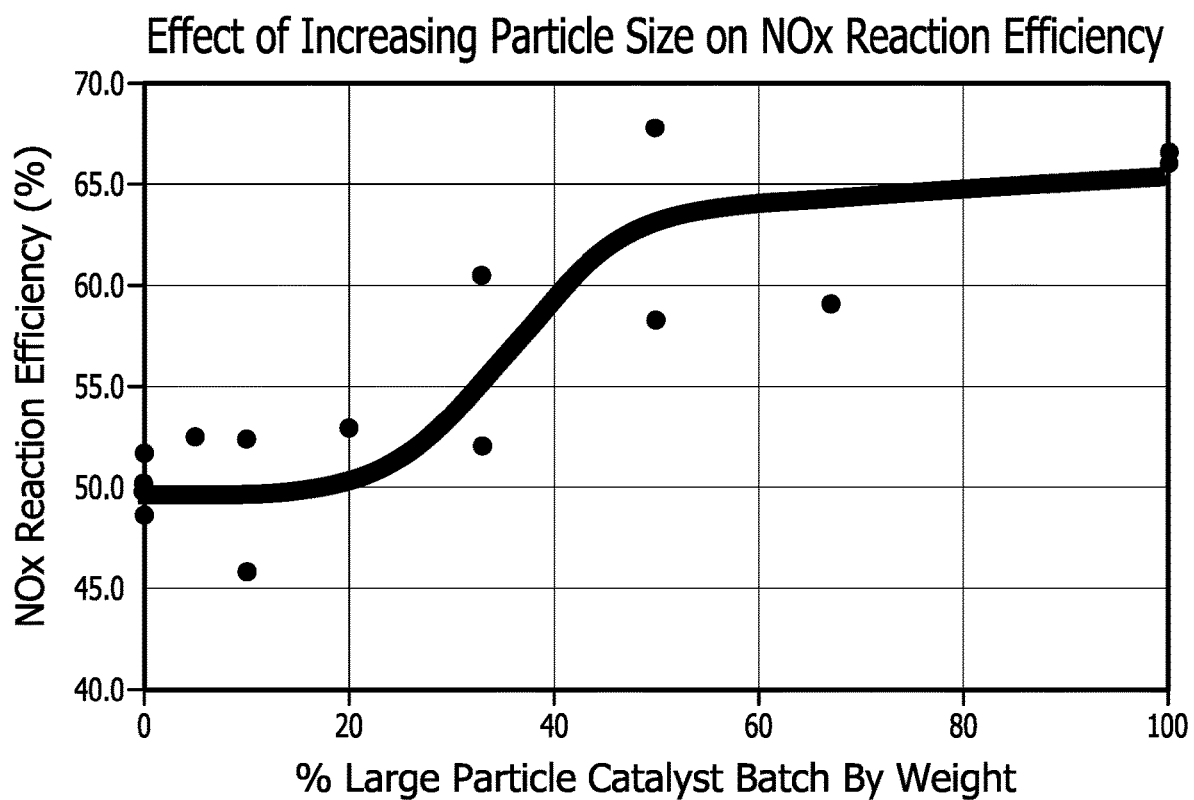
FIG. 14 is a graphical illustration of the large catalyst particle batch (by weight %) vs. NOx reaction efficiency in accordance with at least one embodiment.

FIG. 14 illustrates that there is a transition point where NOx efficiency begins to increase from the 1-2 micron baseline, i.e., when the catalyst mixture contains about 33% by weight of the 69 micron mean "large" particle size (lot X). NOx efficiency continues to increase until the catalyst mix contains about 50% by weight or more of the 69 micron mean particle batch.

Figure 15:
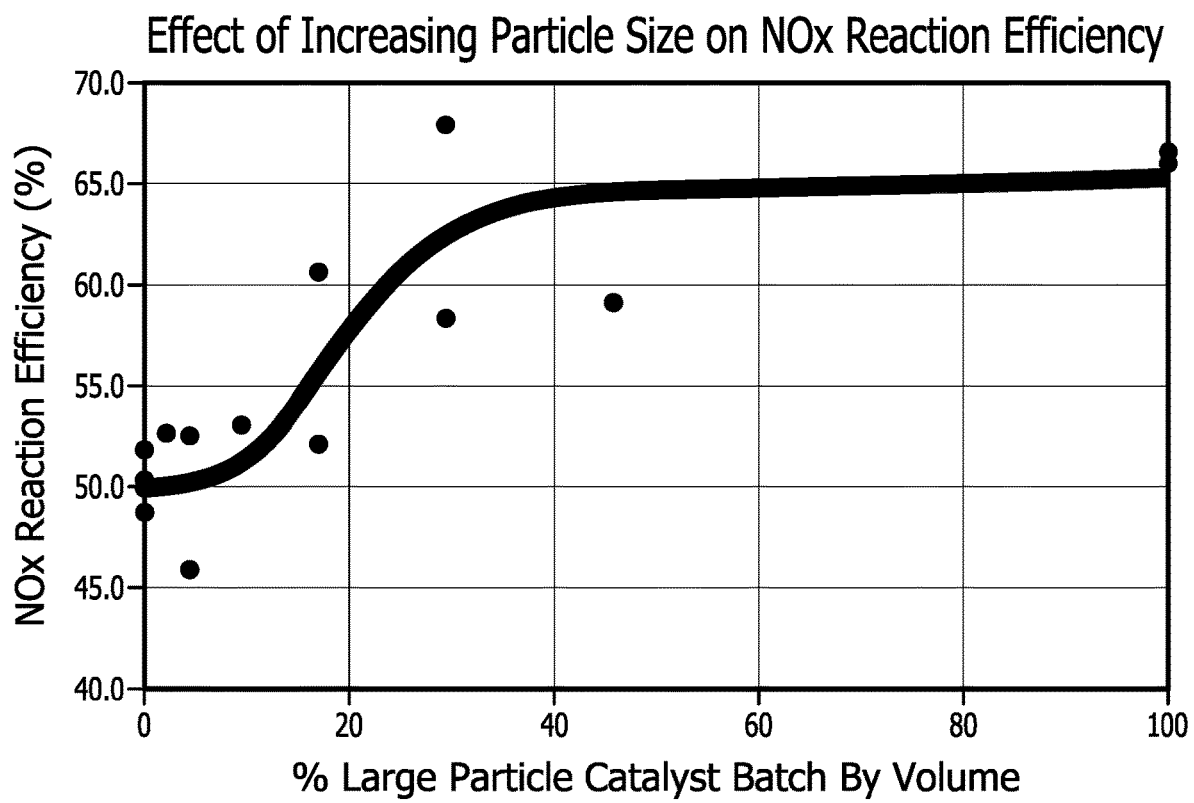
FIG. 15 is a graphical illustration of the large catalyst particle batch (by volume %) vs. NOx reaction efficiency in accordance with at least one embodiment.

Similarly, FIG. 15 illustrates, on a volume ratio basis, that NOx efficiency increases as more "large" particles are added, starting at a baseline with the 1-2 micron particle mix and increasing until there is approximately 30% by volume of the 69 micron mean particles (lot X) contained in the catalyst blend. It was also observed that the membranes containing a higher level of the 69 micron mean particle (lot X) exhibited a higher NOx efficiency and had a grittier texture than those lower efficiency ePTFE membranes that contained a higher percentage of "smaller" 1-2 mean particle size (lot M).

Example 6

Catalytic Articles in the Form of Catalytic Felts

A series of composite filter material (catalytic felts) was formed according to International Patent Application WO 2019/099025. The composite filter material included a porous catalytic fluoropolymer film assembled with a scrim, with upstream and downstream felt batts. Each felt batt was formed of fleece formed from PTFE staple fibers. The filter material was connected by a plurality of perforations formed by a needle punching process. The series of catalytic felts were tested for NOx reaction efficiency performance.

Four supported catalyst powder samples were selected having identical catalyst/support compositions, but different particle size distributions. Sample A had a mean particle size of 1 μm, Sample B had a mean particle size of 23 μm, Sample C had a mean particle size of 65 μm, and Sample D had a mean particle size of 93 μm (Table 6). Catalytic tapes were then prepared using a 1:1 mass ratio of PTFE to Catalyst Powders A and B using the general dry blending methodology taught in U.S. Pat. No. 7,791,861 B2 to Zhong et al. to form composite tapes that were then uniaxially expanded according to the teachings of U.S. Pat. No. 3,953,566 to Gore.

TABLE 6

Supported Catalyst Particle Size Information

| Powder Sample | Mean Particle Size (μm) | D10 (μm) | D50 (μm) | D90 (μm) |
|---|---|---|---|---|
| A | 1 | 0.6 | 0.9 | 1.3 |
| B | 23 | 0.732 | 14.0 | 55.9 |
| C | 65 | 4.83 | 48.8 | 131 |
| D | 93 | 10.5 | 81.1 | 324 |

Three rates of uniaxial expansion were performed to create membranes of 130%, 150%, and 170% of their original tape length to yield ePTFE composite membranes with different catalyst area densities (amount of catalyst mass per square meter). Expanded PTFE composite membranes with the properties set forth in Table 7 were produced.

TABLE 7 ePTFE Composite Membranes

| Sample # | Filler Loading (% by weight) | Mean Particle Size (μm) | Final Thickness (μm) | Catalyst Area Density (g/m$^2$) | NOx Reaction Efficiency (%) |
|---|---|---|---|---|---|
| 1 | 50 | 1 | 864 | 569 | 64 |
| 2 | 50 | 1 | 838 | 498 | 63 |
| 3 | 50 | 1 | 813 | 451 | 63 |
| 4 | 50 | 23 | 826 | 527 | 73 |
| 5 | 50 | 23 | 826 | 465 | 71 |
| 6 | 50 | 23 | 864 | 427 | 70 |
| 7 | 50 | 65 | 864 | 554 | 73 |
| 8 | 50 | 65 | 864 | 488 | 73 |
| 9 | 50 | 65 | 851 | 422 | 72 |

TABLE 7-continued

| | | ePTFE Composite Membranes | | | |
|---|---|---|---|---|---|
| Sample # | Filler Loading (% by weight) | Mean Particle Size (μm) | Final Thickness (μm) | Catalyst Area Density (g/m²) | NOx Reaction Efficiency (%) |
| 10 | 50 | 93 | 813 | 507 | 77 |
| 11 | 50 | 93 | 813 | 454 | 77 |
| 12 | 50 | 93 | 800 | 399 | 74 |

These membranes were then needle felted to create the ePTFE composite membranes described above.

Figure 16:
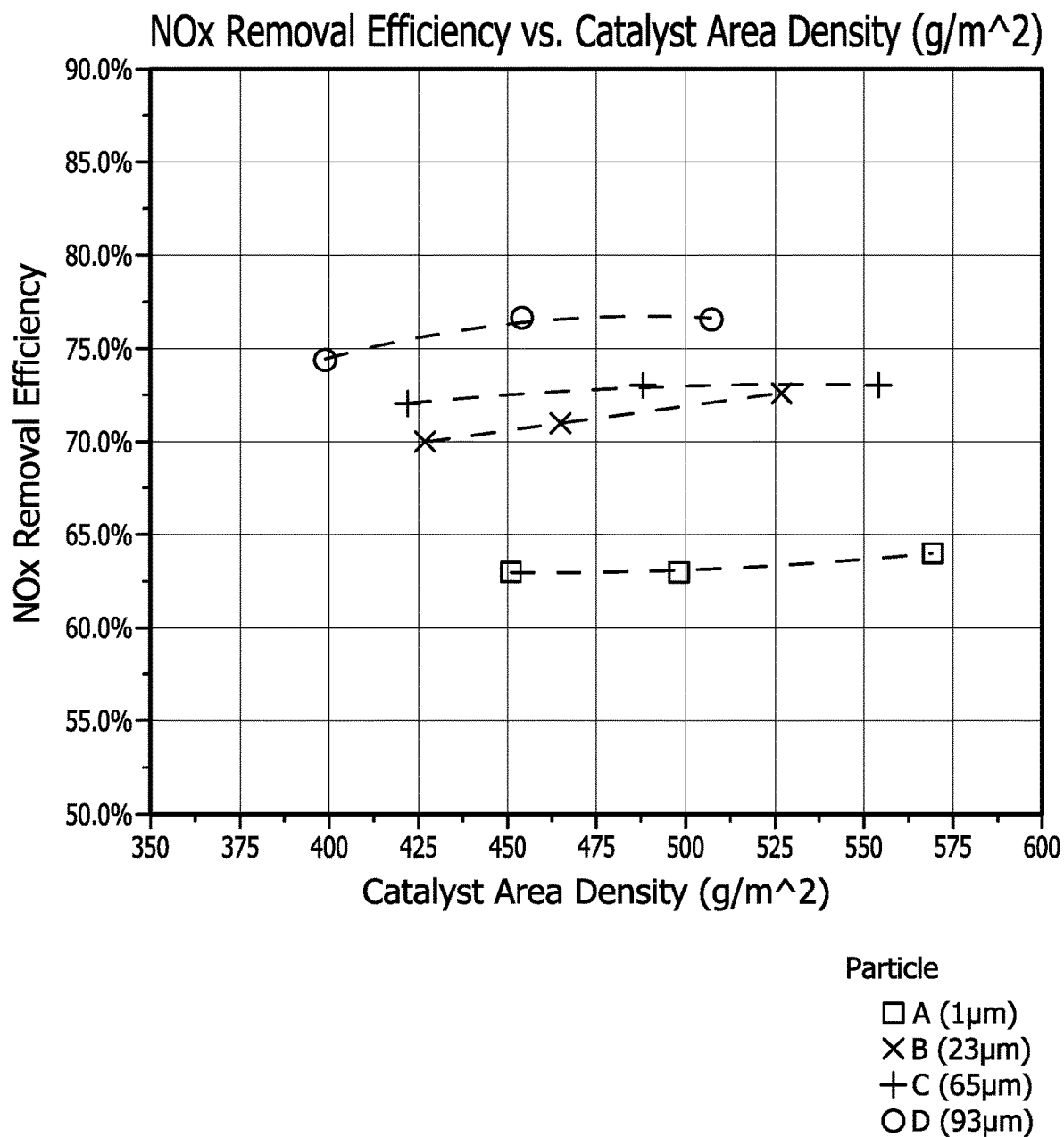
FIG. 16 is a graphical illustration of NOx reaction efficiency vs. catalyst area density (g/m$^2$) at four mean particle sizes (1 µm, 23 µm, 65 µm, 93 µm) in accordance with at least one embodiment.

Finally, the catalytic felt/membrane composites were tested for NOx reaction efficiency as described in Example 1 with the exception that the initial perforation step was not performed. The results of the NOx reaction efficiency testing are shown in FIG. 16 (NOx reaction efficiency performance versus the catalyst area density for the four particle sizes). FIG. 16 illustrates that the felt samples incorporating the particles with a "larger" size (Particle B, C, and D) exhibited higher NOx reaction efficiency compared to the felt sample that incorporated "smaller" particles (Particle A). This increase in NOx reaction efficiency persisted across the range of catalyst area densities tested.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A catalytic article comprising:
a porous fibrillated polymer membrane that includes supported catalyst particles non-covalently immobilized within a node and fibril microstructure of the porous fibrillated polymer membrane, wherein the supported catalyst particles have a particle size distribution defined by a D90 value of at least 60 microns,
wherein the porous fibrillated membrane includes supported catalyst particles in a range from about 30% to about 98%.

2. The catalytic article of claim 1, wherein the supported catalyst particles have a particle size distribution defined by a D90 value of at least 100 microns.

3. The catalytic article of claim 1, wherein a mean particle size of the supported catalyst particle is greater than or equal to 20 microns.

4. The catalytic article of claim 1, wherein the supported catalyst particles have a mean particle size greater than about 20 microns.

5. The catalytic article of claim 1, wherein the supported catalyst particles comprise at least one metal or metal oxide catalyst dispersed on a porous support substrate.

6. The catalytic article of claim 1, wherein the porous fibrillated polymer membrane has a porosity from about 20% to about 90%.

7. The catalytic article of claim 6, wherein at least 40% of the porosity comprises a pore size greater than 9 microns.

8. The catalytic article of claim 1, wherein the porous fibrillated polymer membrane comprises polytetrafluoroethylene (PTFE), poly(ethylene-co-tetrafluoroethylene) (ETFE), ultra-high molecular weight polyethylene (UHMWPE), polyparaxylylene (PPX), polylactic acid, and any combination or blend thereof.

9. The catalytic article of claim 1, wherein the supported catalyst particles have a particle population with a D50 value of 7 microns or more.

10. The catalytic article of claim 1, wherein the porous fibrillated polymer membrane contains perforations therein.

11. The catalytic article of claim 1, wherein the catalytic article is in the form of a filter bag, a honeycomb, monolith or any other suitable geometrically structured forms.

12. The catalytic article of claim 1, wherein the supported catalyst particle is located throughout a thickness of the fibrillated polymer membrane.

13. A catalytic filter material comprising the catalytic article of claim 1.

14. A method to reduce NOx from a gas stream comprising:
a) providing a gas stream comprising a concentration of NOx; and
b) contacting the gas stream with the catalytic article of claim 1, whereby the NOx concentration is reduced.

15. The catalytic article of claim 1, wherein the supported catalyst particles have a particle size distribution defined by a D90 value from 60 microns to 500 microns.

* * * * *